(12) United States Patent
Kawai et al.

(10) Patent No.: US 11,360,741 B2
(45) Date of Patent: *Jun. 14, 2022

(54) ARITHMETIC CIRCUIT

(71) Applicants: NTT ELECTRONICS CORPORATION, Yokohama (JP); NIPPON TELEGRAPH AND TELEPHONE CORPORATION, Tokyo (JP)

(72) Inventors: Kenji Kawai, Tokyo (JP); Ryo Awata, Yokohama (JP); Kazuhito Takei, Yokohama (JP); Masaaki Iizuka, Yokohama (JP)

(73) Assignees: NTT ELECTRONICS CORPORATION, Yokohama (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 46 days.

This patent is subject to a terminal disclaimer.

(21) Appl. No.: 16/959,968

(22) PCT Filed: Dec. 18, 2018

(86) PCT No.: PCT/JP2018/046495
§ 371 (c)(1),
(2) Date: Jul. 2, 2020

(87) PCT Pub. No.: WO2019/135354
PCT Pub. Date: Jul. 11, 2019

(65) Prior Publication Data
US 2021/0064342 A1  Mar. 4, 2021

(30) Foreign Application Priority Data
Jan. 5, 2018  (JP) .............................. JP2018-000451

(51) Int. Cl.
*G06F 7/57* (2006.01)
*G06F 7/544* (2006.01)
(Continued)

(52) U.S. Cl.
CPC .................. *G06F 7/57* (2013.01); *G06F 1/04* (2013.01); *G06F 7/485* (2013.01); *G06F 7/5443* (2013.01);
(Continued)

(58) Field of Classification Search
CPC ....... G06F 7/4812; G06F 7/5442; G06F 17/16
See application file for complete search history.

(56) References Cited

U.S. PATENT DOCUMENTS 5,226,002 A * 7/1993 Wu .......................... G06F 17/16
708/607
5,847,980 A * 12/1998 Okamoto .............. G06F 17/147
708/603
(Continued)

FOREIGN PATENT DOCUMENTS

| JP | 2004-171263 A | 6/2004 |
| JP | 2004-265346 A | 9/2004 |
| JP | 2012-169926 A | 9/2012 |

OTHER PUBLICATIONS

International Preliminary Report on Patentability received for PCT Patent Application No. PCT/JP2018/046495, dated Jul. 16, 2020, 26 pages (17 pages of English Translation and 9 pages of Original Document).
(Continued)

*Primary Examiner* — Chuong D Ngo
(74) *Attorney, Agent, or Firm* — Womble Bond Dickinson (US) LLP

(57) ABSTRACT

An arithmetic circuit includes an LUT generation circuit (1) that, when coefficients c[n] (n=1, ..., N) are paired two by
(Continued)

two, outputs a value calculated for each of the pairs, and a distributed arithmetic circuit (2-$m$) that calculates values y[m] of product-sum arithmetic, by which data x[m, n] of a data set X[m] containing M pairs of data x[m, n] is multiplied by the coefficients c[n] and the products are summed up, in parallel for each of the M pairs. The distributed arithmetic circuit (2-$m$) includes a plurality of binomial distributed arithmetic circuits that calculate the value of binomial product-sum arithmetic in parallel for each of the pairs, based on a value obtained by pairing N data x[m, n] corresponding to the circuit two by two, a value obtained by pairing the coefficients c[n] two by two, and the value calculated by the LUT generation circuit (1), and a binomial distributed arithmetic result summing circuit that sums up the values calculated by the binomial distributed arithmetic circuits and outputs the sum as y[m].

5 Claims, 13 Drawing Sheets

(51) Int. Cl.
  *G06F 1/04* (2006.01)
  *G06F 7/485* (2006.01)
  *G06F 9/30* (2018.01)

(52) U.S. Cl.
  CPC ........ *G06F 9/3001* (2013.01); *G06F 9/30036* (2013.01)

(56) References Cited

U.S. PATENT DOCUMENTS 6,477,203 B1\* 11/2002 Poplin .................... G06F 17/16
  708/620
2005/0201457 A1   9/2005 Allred et al.
2021/0064340 A1\* 3/2021 Kawai .................. G06F 7/5443

OTHER PUBLICATIONS

International Search Report and Written Opinion received for PCT Patent Application No. PCT/JP2018/046495, dated Apr. 2, 2019, 28 pages (17 pages of English Translation and 11 pages of Original Document).
Yi et al., "Implementation Consideration of Linear-Phase Delay Digital Filter Using Distributed Arithmetic on FPGA", Joint research presentation of Tochigi and Gunma branches of the Institute of Electrical Engineers of Japan, Available Online at <URL:https://kobaweb.ei.st.gunma-u.ac.jp/news/pdf/2011/ETT-11-07ekijo.pdf>, Feb. 29, 2012, 26 pages of Original Document Only.

\* cited by examiner

FIG.4

| x[m,2×n'-1][l] | x[m,2×n'][l] | LUT#m-n'-l |
|---|---|---|
| 0 | 0 | 0 |
| 1 | 0 | c[2×n'-1] |
| 0 | 1 | c[2×n'] |
| 1 | 1 | d[n'] |

FIG.8

| x_real[m][l] | x_imag[m][l] | OUTPUT OF REAL PART CALCULATION LUT INDEXING CIRCUIT | OUTPUT OF IMAGINARY PART CALCULATION LUT INDEXING CIRCUIT |
|---|---|---|---|
| 0 | 0 | 0 | 0 |
| 1 | 0 | c_real | c_imag |
| 0 | 1 | - c_imag | c_real |
| 1 | 1 | d_sub | d_add |

FIG.12

| a[1] | a[2] | ... | a[N] | LUT[a] |
|------|------|-----|------|--------|
| 0 | 0 | 0 | 0 | 0 |
| 1 | 0 | 0 | 0 | c[1] |
| 0 | 1 | 0 | 0 | c[2] |
| 1 | 1 | 0 | 0 | c[1] + c[2] |
| ... | ... | ... | ... | ... |
| 1 | 1 | 1 | 1 | c[1] + c[2] + ··· + c[N] |

ARITHMETIC CIRCUIT

TECHNICAL FIELD

The present invention relates to an arithmetic circuit for digital signal processing and, more particularly, to an arithmetic circuit for performing product-sum arithmetic.

BACKGROUND ART

Main arithmetic in digital signal processing is product-sum arithmetic for multiplying digital signal data by a coefficient and adding up the products. Distributed arithmetic is known as a method of efficiently performing this product-sum arithmetic (see non-patent literature 1). FIG. 10 shows a configuration example of a product-sum arithmetic circuit using the distributed arithmetic. FIG. 11 shows a timing chart of the operation of the product-sum arithmetic circuit shown in FIG. 10.

The product-sum arithmetic circuit shown in FIG. 10 is an arithmetic circuit that, when N (N is an integer of 2 or more) data $x[n]$ ($n=1, \ldots, N$) are input, performs product-sum arithmetic by multiplying each data $x[n]$ by coefficients $c[n]$ and adding up the products, i.e., calculates $\Sigma_{n=1,\ldots,N}(c[n] \times x[n])$. The result of the product-sum arithmetic is output by inputting clock pulses equal in number to the bit width of $x[n]$ from the timing at which $x[n]$ ($n=1, \ldots, N$) is input to this product-sum arithmetic circuit.

Before starting the abovementioned product-sum arithmetic, the arithmetic circuit using the abovementioned distributed arithmetic stores, in the memory area of each address of a look-up table (to be referred to as an LUT hereinafter) 1001 formed by a memory circuit such as a ROM (Read Only Memory), a value calculated based on the coefficients $c[n]$ ($n=1, \ldots, N$) and the address, by assuming that the coefficients $c[n]$ ($n=1, \ldots, N$) is a constant. When the data $x[n]$ ($n=1, \ldots, N$) are input, the arithmetic circuit can obtain the same result as the product-sum arithmetic by searching for the values stored in the LUT 1001 based on the data $x[n]$ ($n=1, \ldots, N$), and adding up the readout values from the LUT 1001. As described above, the product-sum arithmetic circuit using the distributed arithmetic does not require a multiplication circuit having a complicated circuit configuration.

As shown in FIG. 12, the LUT 1001 shown in FIG. 10 includes memory areas having $2^N$ addresses. A value calculated based on the coefficients $c[n]$ ($n=1, \ldots, N$) is prestored in the memory area of each address. More specifically, a value LUT[a] stored in an address a is the value of $\Sigma_{n=1,\ldots,N}(c[n] \times a[n])$ when each bit obtained by expressing the address a by binary notation is $a[n]$ ($n=1, \ldots, N$, $a=\Sigma_{n=1,\ldots,N}(2^{n-1} \times a[n])$).

When each bit $x[n][l]$ ($l=1, \ldots, L$, L is the bit width of $x[n]$, $x[n]=\Sigma_{l=1,\ldots,L}(x[n][l] \times 2^{l-1})$) of data $x[n]$ ($n=1, \ldots, N$) is input and a data validity signal is valid, a shift register 1000-XR[n] ($n=1, \ldots, N$) shown in FIG. 10 loads each bit $x[n][l]$ of the data $x[n]$, and outputs individual bits in order from the MSB (Most Significant Bit) to the LSB (Least Significant Bit) whenever a clock pulse is input after that.

The operation of the shift register 1000-XR[n] will be explained with reference to FIG. 13. First, selectors $x[n, 2]$ to $s[n, L]$ select the values of bits $x[n][2]$ to $x[n][L]$ of the data $x[n]$ in accordance with a data validity signal representing "valid" when the data $x[n]$ is input. Then, by using a clock pulse (the first clock pulse) input immediately after that as a trigger, a flip-flop $xr[n, 1]$ loads the value of the bit $x[n][1]$, and flip-flops $xr[n, 2]$ to $xr[n, L]$ respectively load the values of the bits $x[n][2]$ to $x[n][L]$ output from the selectors $s[n, 2]$ to $s[n, L]$. Accordingly, the flip-flop $xr[n, 1]$ loads $x[n][1]$ as the LSB of the data $x[n]$, and the flip-flop $xr[n, L]$ loads $x[n][L]$ as the MSB of the data $x[n]$.

After that, when the data validity signal takes a value representing "invalid", the selectors $s[n, 2]$ to $s[n, L]$ respectively select values output from the flip-flops $xr[n, 1]$ to $xr[n, L-1]$ in the input stage. Whenever a clock pulse is input, therefore, the flip-flops $xr[n, 2]$ to $xr[n, L]$ respectively load values held in the flip-flops $xr[n, 1]$ to $xr[n, L-1]$ in the input stage.

That is, whenever a clock pulse is input, the output value of the flip-flop $xr[n, L]$ ($n=1, \ldots, N$) in the final stage of the shift register 1000-XR[n] changes. The output value of the flip-flop $xr[n, L]$ is $x[n][L]$ when the first clock pulse is input, and is $x[n][L-1]$ when the next clock pulse is input. That is, when the tth ($t=1, \ldots, L$) clock pulse from the timing at which the data validity signal becomes valid is input, the output value of the flip-flop $xr[n, L]$ is $x[n][L-t+1]$.

Assuming that each bit of the read address a when reading out values from the LUT 1001 is $a[n]$ ($n=1, \ldots, N$) in the product-sum arithmetic circuit shown in FIG. 10, the value of $a[n]$ is a value held by the flop-flop $xr[n, L]$. Accordingly, the value of $a[n]$ is $x[n][L-t+1]$ immediately after the tth ($t=1, \ldots, L$) clock pulse from the timing at which the data validity signal becomes valid is input.

When the abovementioned read address a is input, the LUT 1001 outputs a value LUT[a] stored in the memory area of the read address a. The value of LUT[a] is $\Sigma_{n=1,\ldots,N}(c[n] \times a[n])$ as shown in FIG. 12, and the value of $a[n]$ immediately after the tth ($t=1, \ldots, L$) clock pulse from the timing at which the data validity signal becomes valid is input matches the value of $x[n][L-t+1]$. Therefore, the output from the LUT 1001 immediately after the tth ($t=1, \ldots, L$) clock pulse is input is $\Sigma_{n=1,\ldots,N}(c[n] \times x[n][L-t+1])$.

In the product-sum arithmetic circuit shown in FIG. 10, the output value of the abovementioned LUT 1001 and the output value of a doubling circuit 1003 for doubling an accumulated value held by an accumulated value register 1002 are input to an addition circuit 1004. The addition circuit 1004 adds the output values of the LUT 1001 and the doubling circuit 1003, and outputs the result as an addition value y.

Whenever a clock pulse is input, the accumulated value register 1002 holds the addition value y as an updated accumulated value. Note that the value held by the accumulated value register 1002 is reset to 0 when the data validity signal becomes valid, so the initial value (the value when the first clock pulse is input) is 0.

The doubling circuit 1003 for doubling the accumulated value held by the accumulated value register 1002 is implemented by a line that shifts an accumulated value expressed by a binary number to the left by 1 bit, so the process of doubling the accumulated value requires no logic gate. Therefore, a multiplication circuit is not used in the product-sum arithmetic circuit shown in FIG. 10.

A process by which the product-sum arithmetic circuit shown in FIG. 10 outputs the product-sum arithmetic result will be explained. First, when the first clock pulse is input immediately after the data validity signal becomes valid, the addition circuit 1004 outputs the output value of the LUT 1001 as the addition value y because the accumulated value held in the accumulated value register 1002 is 0. That is, the addition value y immediately after the first clock pulse is input is $\Sigma_{n=1,\ldots,N}(c[n] \times x[n][L])$.

Then, when the second clock pulse from the timing at which the data validity signal becomes valid is input, the addition circuit 1004 outputs a value obtained by adding the output value of the LUT 1001 and the output value of the doubling circuit 1003 as the addition value y. The output value of the LUT 1001 is $\Sigma_{n=1,\ldots,N}(c[n]\times x[n][L-1])$, and the accumulated value held in the accumulated value register 1002 is $\Sigma_{n=1,\ldots,N}(c[n]\times x[n][L])$ because it is the addition value immediately after the first clock pulse is input. Accordingly, the addition value y immediately after the second clock pulse is input is $2\times\Sigma_{n=1,\ldots,N}(c[n]\times x[n][L])+\Sigma n=1,\ldots, N(c[n]\times x[n][L-1])$.

Since the output values of the LUT 1001 are added up whenever the clock pulse is input as described above, the addition value y immediately after the Lth clock pulse is input is represented by equation (1) below:

$$y=\Sigma_{t=1,\ldots,L}(2^{L-t}\times\Sigma_{n=1,\ldots,N}(c[n]\times x[n][L-t+1])) \quad (1)$$

When equation (1) representing the addition value y immediately after the Lth clock pulse is input is deformed by substituting t representing the ordinal number of the clock pulse with L−l+1(l=L, . . . , 1), the addition value y immediately after the Lth clock pulse is input is represented by equation (2) below:

$$y=\Sigma_{n=1,\ldots,N}(c[n]\times(\Sigma_{l=L,\ldots,1}(x[n][l]\times 2^{l-1}) \quad (2)$$

Furthermore, x[n][l] is the value of each bit when the data x[n] is expressed by a binary number, and $\Sigma_{l=L,\ldots,1}(x[n][l]\times 2^{l-1})$ in equation (2) matches x[n], so the addition value y immediately after the Lth clock pulse is input is $\Sigma_{n=1,\ldots,N}(c[n]\times x[n])$ as the result of product-sum arithmetic. That is, the addition value y of the product-sum arithmetic circuit is the result of product-sum arithmetic to be obtained when clock pulses equal in number to the bit width L of x[n] are input from the timing at which the data x[n] (n=1, . . . , N) is input.

Note that when the input data x[n] (n=1, . . . , N) is a signed numerical value that can take a negative value, the data x[n] is two's complement. That is, when x[n]≥0, x[n][L]=0 holds, and $x[n]=\Sigma_{l=1,\ldots,L-1}(x[n][l]\times 2^{l-1})$ holds. When Σx [n]<0, x[n][L]=1 holds, and $x[n]=-2^L+\Sigma_{l=1,\ldots,L-1}(x[n][l]\times 2^{l-1})$ holds. In addition, the addition circuit 1004 shown in FIG. 10 is changed so as to perform subtraction instead of addition, i.e., so as to invert the sign with respect to the output value of the LUT 1001, in only the operation immediately after the first clock pulse is input. However, after the second pulse clock is input, addition is performed on the value obtained by doubling the accumulated value, and there is no change.

As described above, the product-sum arithmetic circuit using distributed arithmetic can be implemented by (L×N) flip-flops for shifting an input value bit by bit, a selector for selecting whether to load an input value to the flip-flops, a memory circuit forming an LUT, an accumulated value register (flip-flips equal in number to the bit width of an accumulated value) for loading and holding an accumulated value by using a clock pulse as a trigger, and one addition circuit (an addition/sign inversion circuit when processing signed input data). This obviates the need for any complicated multiplication circuit, and makes it possible to implement the product-sum arithmetic circuit by using a relatively simple circuit.

The conventional product-sum arithmetic circuit using the abovementioned distributed arithmetic requires no multiplication circuit, but it is necessary to search for the value stored in the LUT for each bit position of the data x[n] after the data x[n] is input. That is, it is necessary to repeat the search for the value stored in the LUT by the number of times equal to the bit width L of the data x[n]. This poses the problem that the throughput is low (the time from given data input to the timing at which the next data input becomes possible is long).

Also, when applying the product-sum arithmetic circuit shown in FIG. 10 using the memory circuit as the LUT to product-sum arithmetic in which the values of the coefficients c[n] are not fixed values but vary, it is necessary to recalculate the value held into the LUT and write the result of the recalculation in the LUT (a process of writing the calculation result by accessing all addresses one by one) at the timing at which the values of the coefficients c[n] change. Since the product-sum arithmetic has to be interrupted while the LUT is updated, frequent LUT updates which occur when the coefficients c[n] vary decrease the throughput.

When increasing the speed of product-sum arithmetic using distributed arithmetic by parallelizing LUT search using copied LUTs equal in number to the bit width L of the data x[n], or when increasing the throughput by parallelizing product-sum arithmetic circuits using distributed arithmetic, different search operations are performed on the LUTs even if values held by the LUTs are the same, so each product-sum arithmetic circuit must include a memory circuit for the LUT. The result is a redundant circuit in which a large number of memory elements storing the same value exist, and the circuit scale uselessly increases.

In addition, the product-sum arithmetic circuit adopting distributed arithmetic can also be used in multiplication between complex numbers, which is frequently performed in digital signal processing, by handling the multiplication of a real part and an imaginary part and the addition/subtraction of the multiplication results as product-sum arithmetic. However, some stored values require two identical LUTs, i.e., an LUT for calculating a real part and an LUT for calculating an imaginary part. This results in a redundant circuit in which two memory elements storing the same value exist, and the circuit scale wastefully increases.

RELATED ART LITERATURE

Non-Patent Literature

Non-Patent Literature 1: Ru Yi, Takenori Tateiwa, Koji Asami, Haruo Kobayashi, "Implementation Consideration of Linear-Phase Delay Digital Filter Using Distributed Arithmetic on FPGA", The 2nd IEEJ, Tokyo branch, Tochigi branch/Gunma branch, Joint Forum, 2012

DISCLOSURE OF INVENTION

Problem to be Solved by the Invention

The present invention has been made to solve the above problems, and has as its object to provide an arithmetic circuit capable of reducing the circuit scale and the power consumption, and improving the arithmetic throughput.

Means of Solution to the Problem

The present invention is an arithmetic circuit that receives a data set X[m] (m=1, . . . , M) containing M (M is an integer of not less than 2) pairs of N (N is an integer of 2 or more) data x[m, n] (n=1, . . . , N), and N coefficients c[n], and calculates and outputs M values y[m] of product-sum arithmetic, including an LUT generation circuit configured to, when N coefficients c[n] are paired two by two, output a value calculated for each of the pairs, and M distributed arithmetic circuits configured to calculate and output, in parallel for each of the M pairs, the values y[m] of the product-sum arithmetics as a result of multiplying the N data x[m, n] of the data set X[m] by the N coefficients c[n] and summing up the products, wherein each of the distributed arithmetic circuits includes a plurality of binomial distributed arithmetic circuits configured to calculate and output, based on a value obtained by pairing the N data x[m, n] corresponding to the circuit two by two, a value obtained by pairing the N coefficients c[n] two by two, and the value calculated by the LUT generation circuit, a value of binomial product-sum arithmetic that multiplies the two data x[m, n] by the two coefficients c[n] and sums up the products, in parallel for each of the pairs, and a binomial distributed arithmetic result summing circuit configured to output a result of summing up the values calculated by the plurality of binomial distributed arithmetic circuits, as the values y[m] of the product-sum arithmetic.

Also, the present invention is an arithmetic circuit that receives M (M is an integer of 2 or more) complex numbers X[m] (m=1, . . . , M) each of which is divided into a real part value x_real[m] and an imaginary part value x_imag[m] (m=1, . . . , M), and a complex number coefficient C divided into a real part value c_real and an imaginary part value c_imag, and calculates and outputs M complex number values Y[m] containing a result of real part product-sum arithmetic and a result of imaginary part product-sum arithmetic, including an LUT generation circuit configured to calculate a value d_sub of a difference between the real part value c_real and the imaginary part value c_imag of the complex number coefficient C, and a value d_add of a sum of the real part value c_real and the imaginary part value c_imag, and M distributed arithmetic circuits configured to calculate and output, in parallel for each of M, the complex number values Y[m] as a result of multiplying each of data, which correspond to the circuit, of the complex numbers X[m] by the complex number coefficient C and summing up the products, wherein each of the distributed arithmetic circuits receives the complex number X[m], the real part value c_real and the imaginary part value c_imag of the complex number coefficient C, and the values d_sub and d_add calculated by the LUT generation circuit, and calculates and outputs, in parallel for each of M, y_real[m] as a result of product-sum arithmetic c_real×x_real[m]−c_imag×x_imag[m] of the real part, and y_imag[m] as a result of product-sum arithmetic c_imag×x_real[m]+c_real×x_imag[m] of the imaginary part.

Effect of the Invention

The arithmetic circuit of the present invention can improve the throughput of distributed arithmetic of performing search on an LUT for each bit position of data, by performing parallel processing on all bit positions, instead of repeating the LUT search while shifting target bit positions.

Also, the arithmetic circuit of the present invention uses no memory circuit in the LUT. Therefore, even when applying the present invention to product-sum arithmetic in which the coefficients c[n] or the complex number coefficient C varies with the passage of time, the addresses of the LUT are not updated one by one, but all the addresses can be updated at the same time. Accordingly, the throughput does not decrease even when a frequent LUT update occurs due to the variation of the coefficients c[n] or the complex number coefficient C.

In addition, the arithmetic circuit of the present invention does not increase the processing speed by copying one LUT to a plurality of memory circuits, but uses the common LUT generation circuit as a circuit for generating element values of the LUT, and parallelizes only distributed arithmetic circuits as circuits for searching the LUT. Since this can eliminate a redundant circuit (a copy of a circuit holding the same value), the circuit scale does not increase.

As described above, the present invention can solve the problems of the conventional product-sum arithmetic circuit adopting distributed arithmetic, i.e., the problem that the throughput is lower than that of a product-sum arithmetic circuit using a multiplication circuit, and the problem that the circuit scale increases because circuits holding the same value are parallelized. Furthermore, the present invention can suppress the switching power during multiplication because distributed arithmetic obviates the need for a multiplication circuit. This makes it possible to largely decrease the circuit scale and the power consumption.

BRIEF DESCRIPTION OF DRAWINGS

FIG. 4 is a view for explaining the operation of an LUT indexing circuit according to the first embodiment of the present invention;

FIG. 8 is a view for explaining the operations of a real part calculation LUT indexing circuit and an imaginary part calculation LUT indexing circuit according to the third embodiment of the present invention;

FIG. 12 is a view for explaining a look-up table of the conventional product-sum arithmetic circuit.

BEST MODE FOR CARRYING OUT THE INVENTION

First Embodiment

Figure 1:
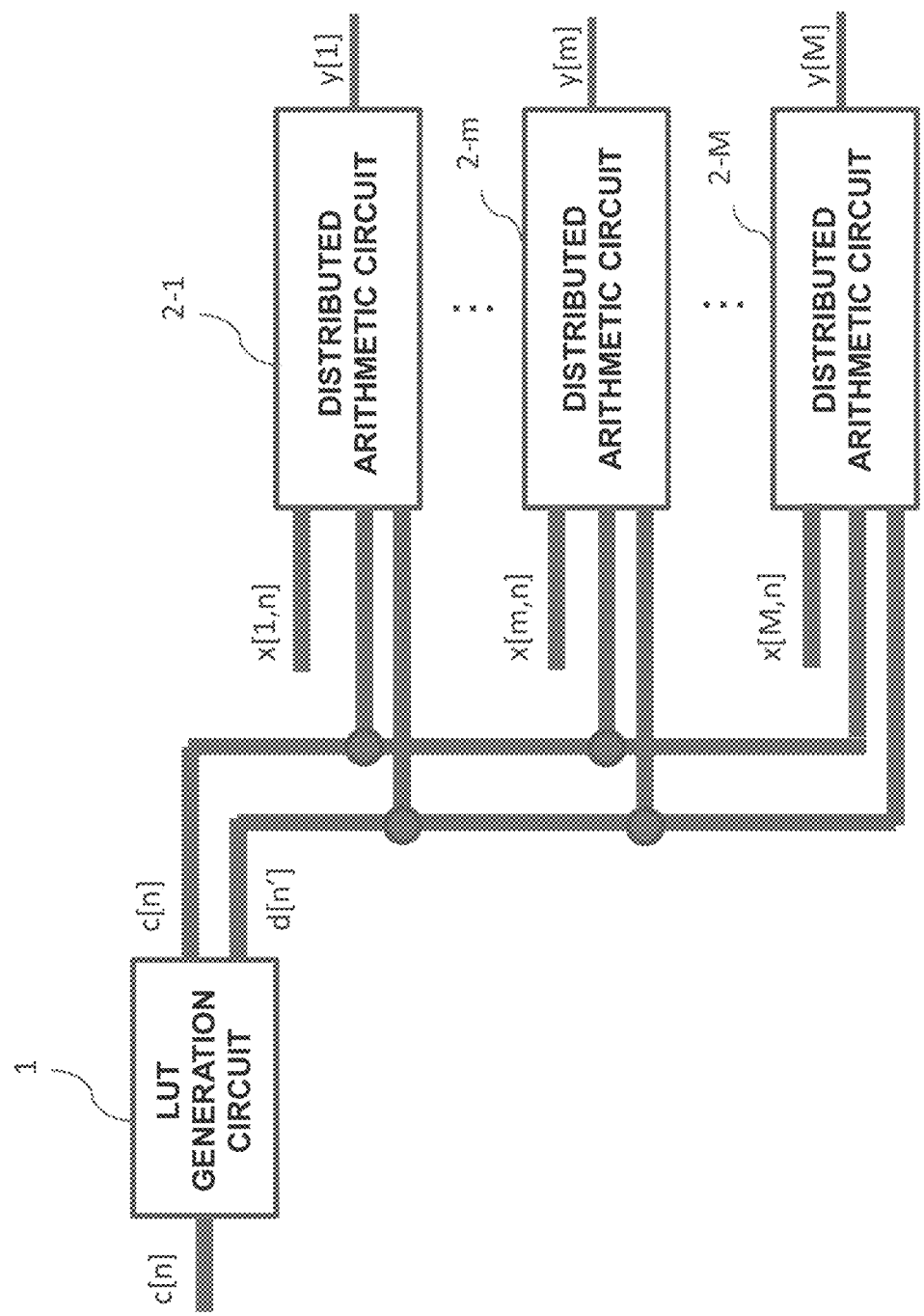
FIG. 1 is a block diagram showing the arrangement of an arithmetic circuit according to the first embodiment of the present invention.

Embodiments of the present invention will be explained below with reference to the accompanying drawings. FIG. 1 is a block diagram showing the arrangement of an arithmetic circuit according to the first embodiment of the present invention. The arithmetic circuit of this embodiment receives M (M is an integer of 2 or more) data sets X[m] (m=1, ..., M) and N (N is an integer of 2 or more) coefficients c[n] (n=1, ..., N). Each data set X[m] (m=1, ..., M) includes N data x[m, n] (m=1, ..., N). Note that the data x[m, n] (m=1, ..., M, n=1, ..., N) is a signed numerical value (a numerical value expressed by a two's-complement binary number) that can take a negative value.

The arithmetic circuit shown in FIG. 1 calculates M values y[m] (m=1, ..., M) of product-sum arithmetic with respect to the abovementioned inputs, and outputs the values y[m]. Each of the values y[m] (m=1, ..., M) of the product-sum arithmetic output from the arithmetic circuit is a value obtained by multiplying each of the N data x[m, n] (n=1, ..., N) forming the data set X[m] (m=1, ..., M) by the coefficients c[n] and summing up the products, i.e., a value equivalent to $\Sigma_{n=1, \ldots, N}(c[n] \times x[m, n])$.

The arithmetic circuit shown in FIG. 1 includes one LUT generation circuit 1 and M (M is an integer of 2 or more) distributed arithmetic circuits 2-1 to 2-M.

The LUT generation circuit 1 receives the N coefficients c[n] (n=1, ..., N) as the coefficients of product-sum arithmetic, and calculates values to be used as elements of a distributed arithmetic LUT from the values of pairs obtained by pairing the N coefficients c[n] (n=1, ..., N) two by two. Then, the LUT generation circuit 1 distributes the calculated values together with the coefficients c[n] to the distributed arithmetic circuits 2-1 to 2-M.

The method of pairing the coefficients c[n] (n=1, ..., N) must be the same as the pairing of c[p] and c[q] in binomial product-sum arithmetic calculations c[p]×x[m, p]+c[q]×x[m, q] (each of p and q is an integer within the range of 1 to N, and p≠q) based on distributed arithmetic, which are performed in distributed arithmetic circuits 2-m (m=1, ..., M).

In this embodiment, a method of pairing the coefficients c[n] such that odd-numbered values having consecutive ordinal numbers are paired with immediately succeeding even-numbered values will be explained. In the pairing of this embodiment, therefore, c[2×n'−1] and c[2×n'] (n'=1, ..., N', N' is a maximum integer that is N/2 or less) belong to the same pair, like c[1] and c[2], c[3] and c[4], .... The value of N' is N/2 when N is an even number, and is (N−1)/2 when N is an odd number.

Note that the present invention is not limited to this pairing method, and the method of pairing the coefficients c[n] need only be the same as the pairing method in binomial product-sum arithmetic based on distributed arithmetic, which is performed in the distributed arithmetic circuits 2-m (m=1, ..., M).

The LUT generation circuit 1 calculates the sum of the values c[2×n'−1] and c[2×n'] (n'=1, ..., N') obtained by pairing the coefficients c[n] (n=1, ..., N), i.e., calculates c[2×n'−1]+c[2×n'] as d[n'], and outputs the coefficients c[n] (n=1, ..., N) and the calculated values d[n'] (n'=1, ..., N') to the distributed arithmetic circuits 2-1 to 2-M.

Note that the present invention is not limited to the above calculation, and it is only necessary to use a calculation for generating elements of the distributed arithmetic LUT to be used in each of the distributed arithmetic circuits 2-m (m=1, ..., M).

Each of the distributed arithmetic circuits 2-m (m=1, ..., M) receives the data set X[m] including the N data x[m, n] (n=1, ..., M), the coefficients c[n] (n=1, ..., N) distributed from the LUT generation circuit 1, and the values d[n'] (n'=1, ..., N') calculated by the LUT generation circuit 1, and outputs a value obtained by multiplying each of the N data x[m, n], which correspond to the circuit, of the data set X[m] by the coefficients c[n] and summing up the products, i.e., outputs the values y[m] equivalent to $\Sigma_{n=1, \ldots, N}(c[n] \times x[m, n])$.

Figure 2:
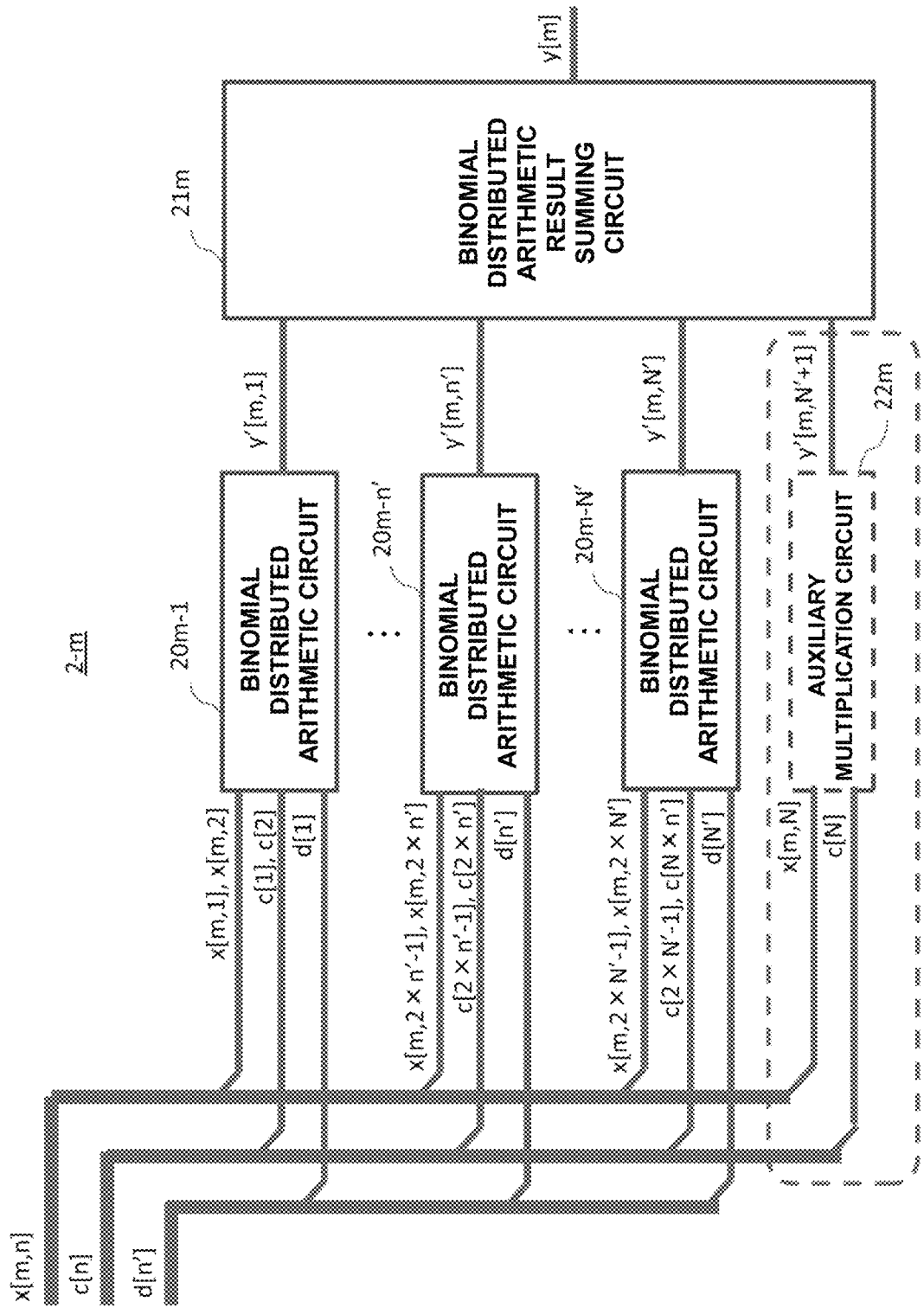
FIG. 2 is a block diagram showing the arrangement of a distributed arithmetic circuit according to the first embodiment of the present invention.

FIG. 2 shows the arrangement of the distributed arithmetic circuit 2-*m* (m=1, ..., M). Each of the distributed arithmetic circuits 2-*m* includes N' binomial distributed arithmetic circuits 20*m-n'* (n'=1, ..., N'), and a binomial distributed arithmetic result summing circuit 21*m*.

The distributed arithmetic circuit 2-*m* shown in FIG. 2 pairs the N data x[m, n], which correspond to the circuit, of the input data set X[m], in the same manner as the pairing performed on the coefficients c[n] (n=1, ..., N) by the LUT generation circuit 1.

The LUT generation circuit 1 of this embodiment pairs the coefficients c[n] (n=1, ..., N) so that the values of odd numbers having consecutive ordinal numbers are paired with the values of immediately succeeding even numbers. Accordingly, x[m, 2×n'−1] and x[m, 2×n'] (n'=1, ..., N', N' is a maximum integer that is N/2 or less) are paired in the pairing performed on the N data x[m, n] by each of the distributed arithmetic circuits 2-*m* as well.

Each of the binomial distributed arithmetic circuits 20*m-n'* (n'=1, ..., N') receives a pair of data x[m, 2×n'−1] and x[m, 2×n'] corresponding to the circuit, a pair of coefficients c[2×n'−1] and c[2×n'], which correspond to the circuit, of the coefficients c[n] (n=1, ..., N), and the values d[n'] calculated by the LUT generation circuit 1.

The binomial distributed arithmetic circuit 20*m-n'* forms an LUT having 0, c[2×n'−1], c[2×n'], and d[n'] as the numerical values of elements, obtains the result of product-sum arithmetic c[2×n'−1]×x[m, 2×n'−1]+c[2n']×x[m, 2×n'] by distributed arithmetic using the LUT, and outputs the result as y'[m, n'].

The binomial distributed arithmetic result summing circuit 21*m* sums up the values y'[m, n'] output from the binomial distributed arithmetic circuits 20*m-n'*, i.e., calculates $\Sigma_{n'=1, \ldots, N'}(y'[m, n'])$, and outputs the result as y[m].

Note that the above explanation of the distributed arithmetic circuit 2-*m* is a case in which N is an even number. When N is an odd number, as shown in FIG. 2, an auxiliary multiplication circuit 22*m* that calculates c[N]×x[m, N] and outputs the result as y'[m, N'+1] is added.

In addition, when N is an odd number, the binomial distributed arithmetic result summing circuit 21*m* sums up the values y'[m, n'] (n'=1, ..., N') output from the binomial distributed arithmetic circuits 20*m-n'* (n'=1, ..., N') and the value y'[m, N'+1] output from the auxiliary multiplication circuit 22*m*, and outputs the result as y[m].

Figure 3:
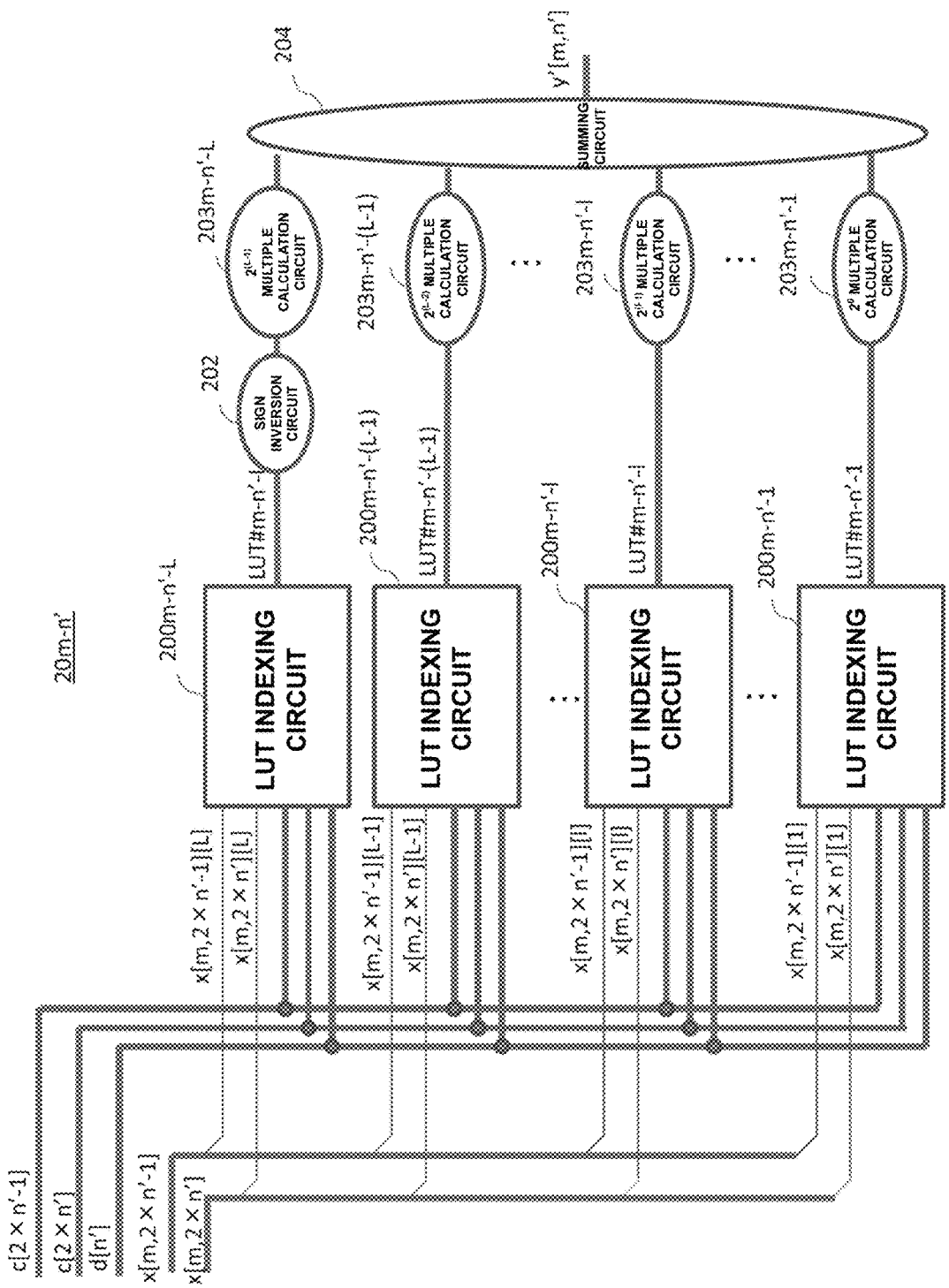
FIG. 3 is a block diagram showing the arrangement of a binomial distributed arithmetic circuit according to the first embodiment of the present invention.

FIG. 3 shows the arrangement of the binomial distributed arithmetic circuit 20*m-n'* (m=1, ..., M, n'=1, ..., N'). Let L be the bit width of one of given data x[m, n] (m=1, ..., M, n=1, ..., N), x[m, 2×n'−1][l] (l=1, ..., L) be each bit of the data x[m, 2×n'−1] as an input to the binomial distributed arithmetic circuit 20*m-n'*, and x[m, 2×n'][l] (l=1, ..., L) be each bit of x[m, 2×n'].

The binomial distributed arithmetic circuit 20*m-n'* shown in FIG. 3 includes L LUT indexing circuits 200*m-n'-l* (selection circuits), a sign inversion circuit 202, L multiple calculation circuits 203*m-n'-l* and a summing circuit 204.

The binomial distributed arithmetic circuit 20*m-n'* includes the LUT indexing circuit 200*m-n'-l* formed for each bit position l (l=1, ..., L) of the data x[m, 2×n'−1] and x[m, 2×n']. The LUT indexing circuit 200*m-n'-l* selects one of four elements of the LUT based on the bits x[m, 2×n'−1][l] and x[m, 2×n'][l], in the bit position l corresponding to the circuit, of the data x[m, 2×n'−1] and x[m, 2×n'], and obtains the selected element as LUT #m-n'-l.

Figure 4:
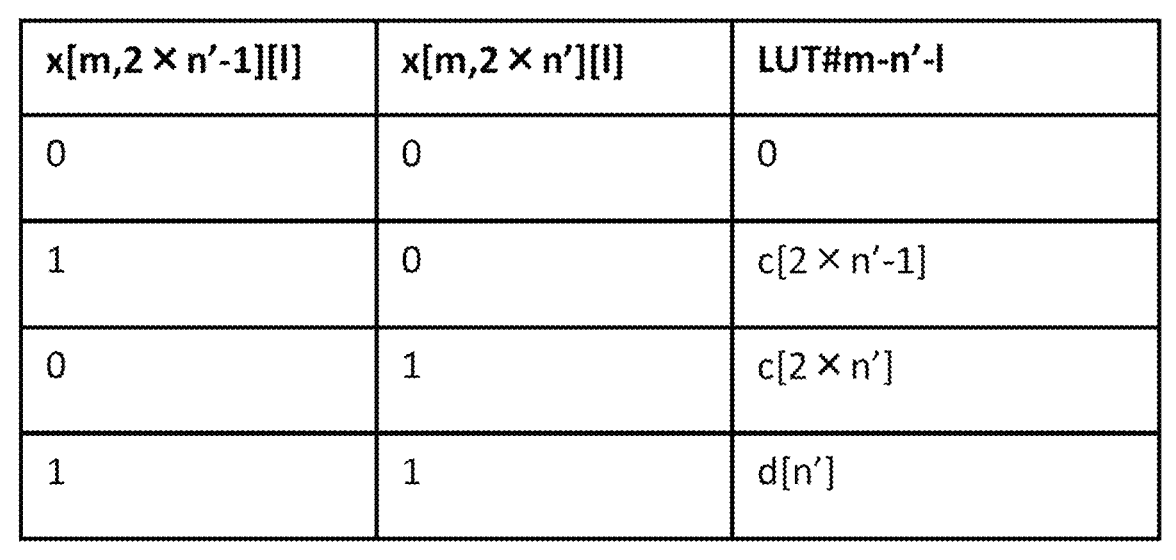

FIG. 4 shows the relationship between each value of the bits x[m, 2×n'−1] [l] and x[m, 2×n'] and the selected element value LUT #m-n'-l of the LUT. This relationship between each value of the bits x[m, 2×n'−1][l] and x[m, 2×n'] and the element value LUT #m-n'l is the same as the relationship between each address and a stored value corresponding to the address, as shown in FIG. 12 for N=2 (binomial product-sum arithmetic).

That is, an address a[0] in FIG. 12 corresponds to the bit x[m, 2×n'−1][l] in FIG. 4, an address a[1] in FIG. 12 corresponds to the bit x[m, 2×n'][l] in FIG. 4, c[0] in FIG. 12 corresponds to c[2×n'−1] in FIG. 4, and c[1] in FIG. 12 corresponds to c[2×n'] in FIG. 4.

In the binomial distributed arithmetic circuit 20m-n' shown in FIG. 3, the element value LUT #m-n'-l of the LUT selected for each bit position l (l=1, . . . , L) by the LUT indexing circuit 200m-n'-l is multiplied by $2^{(l-1)}$ by the multiple calculation circuit 203m-n'-l.

The summing circuit 204 outputs the result of summation of the values calculated by the L multiple calculation circuits 203m-n'l, as y'[m, n'] that is the result of product-sum arithmetic c[2×n'−1]×x[m, 2×n'−1]+c[2n']×x[m, 2×n'].

In the bit position (the MSB position of data) where l=L, however, the sign inversion circuit 202 inverts the sign of the selected element value LUT #m-n'-L, and the multiple calculation circuit 203m-n'-L multiplies the result by $2^{(L-1)}$.

Figure 10:
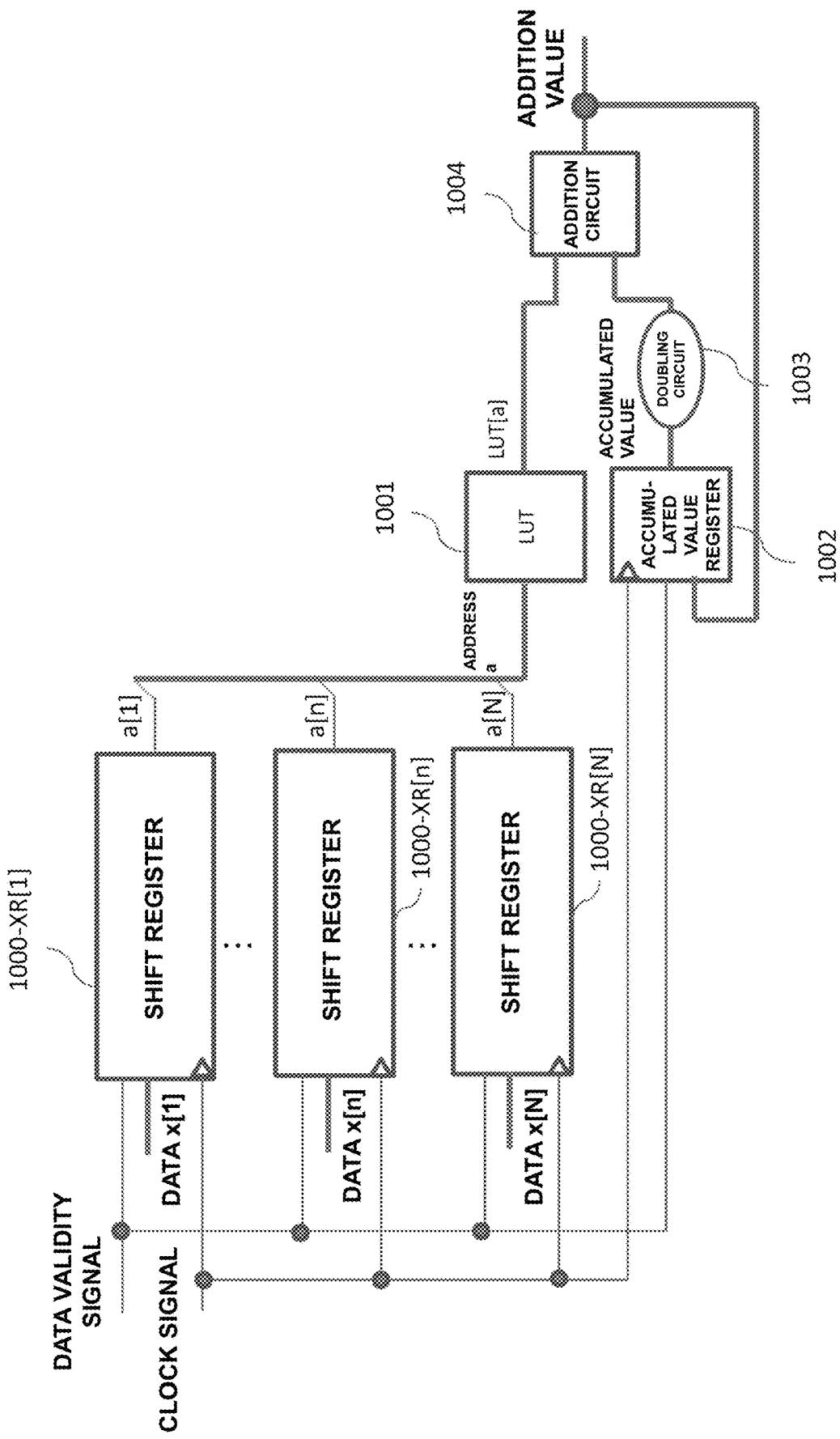
FIG. 10 is a block diagram showing a configuration example of a conventional product-sum arithmetic circuit.
Figure 11:
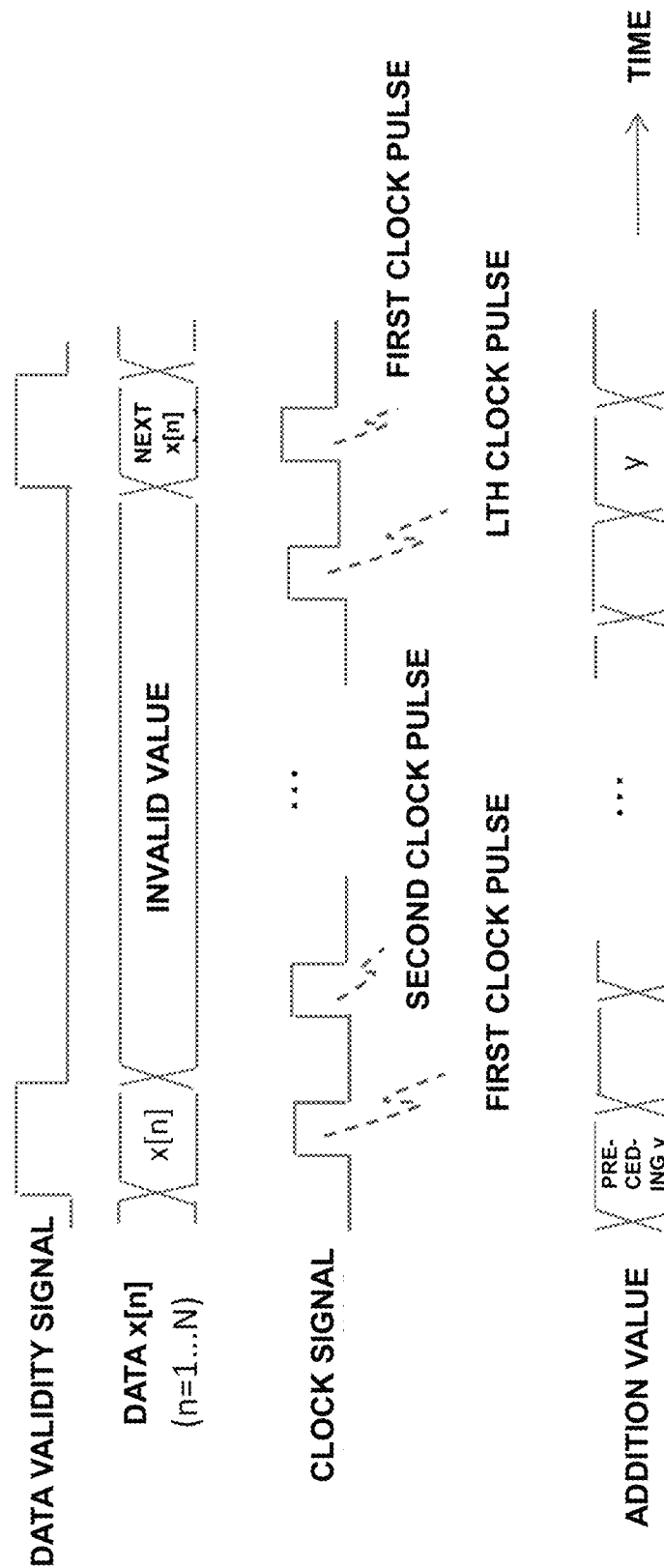
FIG. 11 is a timing chart for explaining the operation of the conventional product-sum arithmetic circuit.
Figure 13:
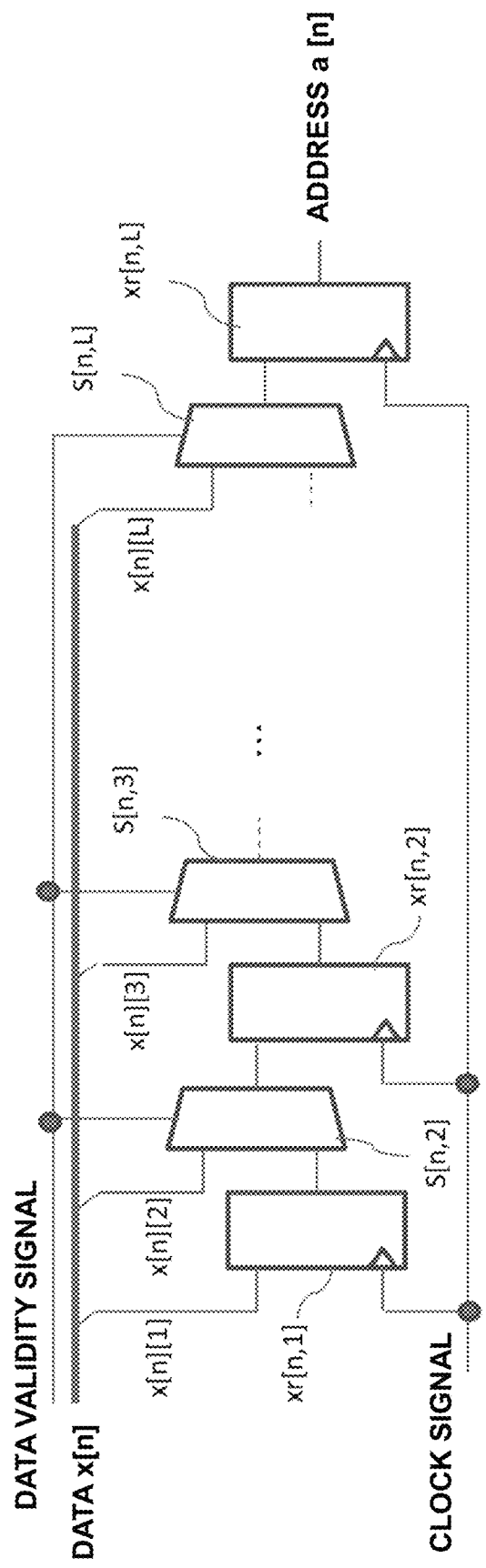
FIG. 13 is a block diagram showing a configuration example of a shift register of the conventional product-sum arithmetic circuit.

In the conventional product-sum arithmetic circuit shown in FIG. 10, the result of product-sum arithmetic can be obtained by L input clock pulses by performing the process by which, when the lth clock pulse is input, the LUT output value in the bit position l is added to a value obtained by doubling the accumulated value.

On the other hand, in the binomial distributed arithmetic circuit 20m-n' shown in FIG. 3, the processes equivalent to the LUT 1001, the accumulated value register 1002, the doubling circuit 1003, and the addition circuit 1004 shown in FIG. 10 are performed on all bit positions l (l=1, . . . , L) at the same time. This makes it possible to immediately obtain the result of product-sum arithmetic without requiring L input clock pulses.

Note that in this embodiment, the sign of the selected element value LUT #m-n'-L is inverted in the bit position L of the MSB. This is so because the data x[m, n] (m=1, . . . , M, n=1, . . . , N) is a signed numerical value (a numerical value expressed by a two's-complement binary number) that can take a negative value. If the data x[m, n] is an unsigned numerical value limited to 0 or more, the multiple calculation circuit 203m-n'-L can directly multiply the element value LUT #m-n'-L by $2^{(L-1)}$ even in the bit position L of the MSB, as in other bit positions.

Note also that the process of multiplying the selected element value LUT #m-n'-l by $2^{(l-1)}$ in the abovementioned bit position l can be implemented by shifting the element value LUT #m-n'-l expressed by a binary number to the left by (l−1) bits. Accordingly, the L multiple calculation circuits 203m-n'-l can be implemented by simple circuits without using any multiplication circuit.

The M numerical values y[m] (m=1, . . . , M) output from the arithmetic circuit of this embodiment are the same values as the result $\Sigma_{n=1, \ldots, N}(c[n] \times x[m, n])$ of product-sum arithmetic by which each of the N data x[m, n] (n=1, . . . , N) forming each data set X[m] (m=1, . . . , M) is multiplied by the N coefficients c[n] and the products are summed up.

The product-sum arithmetic circuit shown in FIG. 10 implements N-nomial product-sum arithmetic including the multiplication of the numerical values of N data and N coefficients and the summation of the products by distributed arithmetic.

On the other hand, the arithmetic circuit of this embodiment divides N-nomial product-sum arithmetic into N' binominal product-sum arithmetics, implements each binominal product-sum arithmetic by parallel arithmetic, and sums up the results, thereby obtaining the same result as the N-nomial product-sum arithmetic. The effect obtained by the difference between the arrangements described above will be explained below.

The product-sum arithmetic circuit shown in FIG. 10 requires one LUT 1001 including $2^N$ elements in order to implement N-nomial product-sum arithmetic by distributed arithmetic. A memory circuit having $2^N$ addresses is used as the LUT 1001. In the LUT 1001 implemented by a memory circuit, the area of a storage element per bit is smaller than that of an LUT circuit implemented by flip-flops and logic gates. In addition, the LUT circuit implemented by a memory circuit can efficiently implement a process of reading out a value stored in one address designated from a value stored in each of a large number of addresses (by using a high-speed, low-power-consumption, and small-area circuit). This feature increases the processing speed and decreases the power consumption and the area when the LUT 1001 including many elements shown in FIG. 10 is implemented by using a memory circuit, instead of using flip-flops and logic gates.

In the product-sum arithmetic circuit shown in FIG. 10, however, the memory circuit of the LUT 1001 must be read for each bit position of data, so the throughput is restricted by memory accesses equal in number to the bit width of the data. As a measure for relaxing this throughput restriction, there is a method of using memory circuits equal in number to the bit width of data, and copying one LUT 1001 to these memory circuits, thereby making it possible to search LUTs at the same time for all bit positions. However, this method requires a large number of memory circuits and hence increases the circuit area.

The arithmetic circuit of this embodiment divides N-nomial product-sum arithmetic into N' (=N/2) binominal product-sum arithmetics, thereby largely reducing the number of numerical values to be held in the LUTs (the LUT generation circuit 1 and the LUT indexing circuits 200m-n'-l). This arrangement does not pose the problem of the circuit scale even when forming the LUT by using flip-flops and logic gates instead of a memory circuit.

That is, when performing N-nomial product-sum arithmetic by distributed arithmetic by using one LUT 1001, the LUT 1001 must hold $2^{N-1}$ numerical values (although the number of addresses is $2^N$, the number of numerical values to be held is $2^{N-1}$ because 0 is placed in one of these addresses and no numerical value needs to be held in that address).

On the other hand, this embodiment divides N-nomial product-sum arithmetic into N' (=N/2) binominal product-sum arithmetics, and hence uses N' (=N/2) LUTs (the LUT generation circuit 1 and the LUT indexing circuits 200m-n'-l) for holding 3 (=$2^2$−1) numerical values. Accordingly, (N×1.5) numerical values need only be held.

For example, when N=8, the number of numerical values to be held can be reduced from 255 to 12, so it is possible to obtain an arrangement that does not pose the problem of the circuit scale even when using no memory circuit as the LUTs (the LUT generation circuit 1 and the LUT indexing circuits 200$m$-$n'$-$l$). Note that when N-nomial product-sum arithmetic is divided into binomial product-sum arithmetics, the binomial distributed arithmetic result summing circuit 21$m$ for summing up N' (=N/2) binomial product-sum arithmetic results must be added. However, the circuit scale of the binomial distributed arithmetic result summing circuit 21$m$ is much smaller than that of the memory circuit forming the LUT 1001, so no problem arises.

As described above, the arithmetic circuit of this embodiment can largely reduce the number of element values to be held in the LUTs (the LUT generation circuit 1 and the LUT indexing circuits 200$m$-$n'$-$l$) by dividing N-nomial product-sum arithmetic into binomial product-sum arithmetics. In addition, the arithmetic circuit of this embodiment can largely reduce the total scale of the LUT indexing circuits 200$m$-$n'$-$l$. This will be explained below by comparison with a case in which N-nomial product-sum arithmetic is divided into trinomial product-sum arithmetics.

When dividing N-nomial product-sum arithmetic into binomial product-sum arithmetics, N/2 LUT indexing circuits 200$m$-$n'$-$l$ as 4:1 selectors are necessary. When dividing N-nomial product-sum arithmetic into trinomial product-sum arithmetics, N/3 LUT indexing circuits as 8:1 selectors are necessary. The 4:1 selector can be formed by three 2:1 selectors, and the 8:1 selector can be formed by seven 2:1 selectors. Accordingly, (N×1.5) 2:1 selectors are necessary when dividing N-nomial product-sum arithmetic into binomial product-sum arithmetics, and (N×7/3) 2:1 selectors are necessary when dividing N-nomial product-sum arithmetic into trinomial product-sum arithmetics.

Also, when dividing N-nomial product-sum arithmetic into binomial product-sum arithmetics, the element values of the LUT include the total values d[$n'$] of the two coefficients c[2×$n'$−1] and c[2×$n'$]. Therefore, the bit width of the element values of the LUT is the bit width of the coefficients c[2×$n'$−1] and c[2×$n'$]+1 bit.

On the other hand, when dividing N-nomial product-sum arithmetic into trinomial product-sum arithmetics, the element values of the LUT include the total value of three coefficients, so the bit width of the element values of the LUT is the bit width of the coefficients+2 bits. Therefore, the number of 2:1 selectors to be used in the LUT indexing circuit and the bit width of the 2:1 selectors when dividing N-nomial product-sum arithmetic into trinomial product-sum arithmetics become larger than those when dividing N-nomial product-sum arithmetic into binomial product-sum arithmetics. Thus, the arithmetic circuit of this embodiment effectively reduces the total scale of the LUT indexing circuits 200$m$-$n'$-$l$ by dividing N-nomial product-sum arithmetic into binomial product-sum arithmetics.

In the arithmetic circuit of this embodiment, the LUT (the LUT generation circuit 1 and the LUT indexing circuit 200$m$-$n'$-$l$) is not a memory circuit but includes a circuit for generating element values beforehand and a circuit for selecting element values by using a logic gate such as a selector. When an LUT is a memory circuit as in the conventional arrangement, a plurality of memory circuits obtained by copying the LUT must be prepared for each bit position of data or for each product-sum arithmetic circuit, in order to increase the throughput by parallelization for searching the LUT for all bit positions of the data at the same time, or by parallelization of the product-sum arithmetic circuits themselves.

The arithmetic circuit of this embodiment does not use a memory circuit in the LUT, and hence can be divided into a circuit (the LUT generation circuit 1) for generating and holding each element value of the LUT in advance, and circuits (the LUT indexing circuits 200$m$-$n'$-$l$) for selecting an element value, and only the LUT indexing circuits 200$m$-$n'$-$l$ are parallelized without parallelizing the LUT generation circuit 1. This makes it possible to prevent the formation of a redundant circuit, i.e., the parallelization (copying) of circuits for holding the element values of the LUT, and suppress an increase in circuit scale caused by parallelization.

In addition, in the arithmetic circuit explained in this embodiment, the time required from the data input timing to the result output timing can be made equal to a time proportional to the square root of the bit width of the input data, like a general product-sum arithmetic circuit that calculates $\Sigma_{n=1, \ldots, N}(c[n] \times x[m, n])$ by using a multiplication circuit and an addition circuit.

On the other hand, the product-sum arithmetic circuit shown in FIG. 10 cannot obtain the calculation result until clock pulses equal in number to the bit width of input data are completely input. Accordingly, the time required from the data input timing to the result output timing is a time proportional to the bit width of the input data. Thus, the arithmetic circuit of this embodiment requires only the calculation time proportional to the square root of the bit width of input data. Consequently, the throughput can be improved compared to the product-sum arithmetic circuit shown in FIG. 10 that requires the calculation time proportional to the bit width.

Also, in the arithmetic circuit of this embodiment, no memory circuit is used in the LUT (the LUT generation circuit 1 and the LUT indexing circuit 200$m$-$n'$-$l$), i.e., the LUT generation circuit 1 distributes element values of the LUT, and the binomial distributed arithmetic circuit 20$m$-$n'$ having received the distributed element values selects one of these element values. Therefore, when applying this embodiment to product-sum arithmetic in which the coefficients c[n] vary with the passage of time, the change in coefficients c[n] can immediately be reflected on the LUT.

On the other hand, when using a memory circuit in the LUT 1001 as in the product-sum arithmetic circuit shown in FIG. 10, a process of accessing addresses of the memory circuit one by one and rewriting stored values is necessary, so product-sum arithmetic is interrupted until the rewriting process is completely performed on all the addresses. As described above, the arithmetic circuit of this embodiment does not decrease the throughput even when a frequent LUT update occurs due to the variation in coefficients c[n].

Second Embodiment

Figure 5:
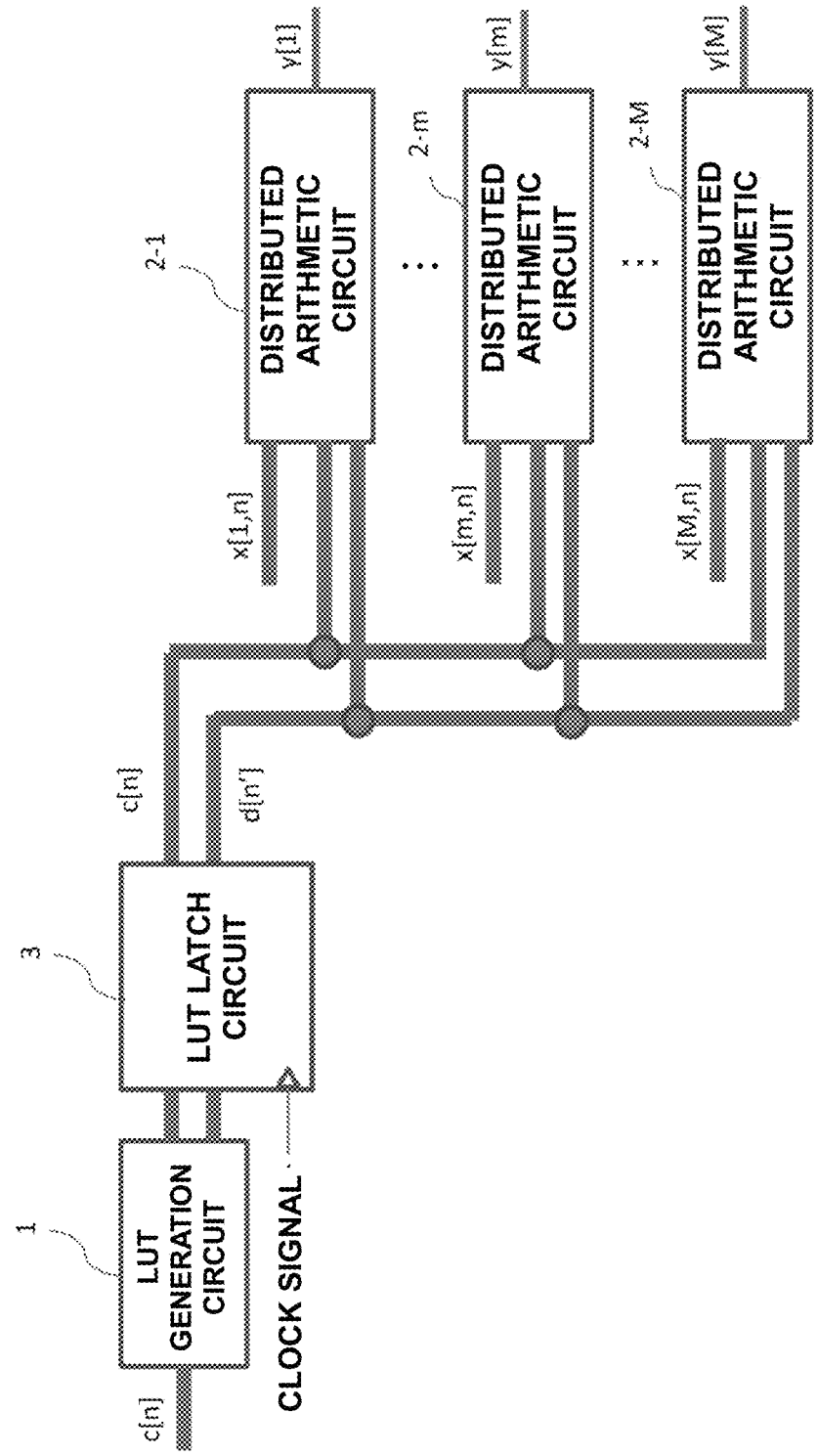
FIG. 5 is a block diagram showing the arrangement of an arithmetic circuit according to the second embodiment of the present invention.

The second embodiment of the present invention will be explained below. FIG. 5 is a block diagram showing the arrangement of an arithmetic circuit according to the second embodiment. In FIG. 5, the same reference numerals as in FIG. 1 denote the same parts. Compared to the arithmetic circuit disclosed in the first embodiment, the second embodiment discloses an arrangement for improving the throughput without increasing the circuit scale and the power consumption.

Like the arithmetic circuit shown in FIG. 1, the arithmetic circuit shown in FIG. 5 receives M (M is an integer of 2 or more) data sets X[m] (m=1, ..., M), and N (N is an integer of 2 or more) coefficients c[n] (n=1, ..., N). Each data set X[m] (m=1, ..., M) contains N data x[m, n] (n=1, ..., N). Note that the data x[m, n] (m=1, ..., M, n=1, ..., N) is a signed numerical value (a numerical value expressed by a two's-complement binary number) that can take a negative value.

Like the arithmetic circuit shown in FIG. 1, the arithmetic circuit shown in FIG. 5 calculates and outputs M values y[m] (m=1, . . . , M) of product-sum arithmetic with respect to the abovementioned inputs. Each of the product-sum arithmetic values y[m] (m=1, . . . , M) output from the arithmetic circuit is a value equivalent to a result of multiplying each of the N data x[m, n] forming the data set X[m] (m=1, . . . , M) by the coefficients c[n] and summing up the products, i.e., equivalent to $\Sigma_{n=1, \ldots, N}(c[n] \times x[m, n])$.

The arithmetic circuit shown in FIG. 5 includes one LUT generation circuit 1, one LUT latch circuit 3, and M (M is an integer of 2 or more) distributed arithmetic circuits 2-1 to 2-M.

The LUT generation circuit 1 receives the N coefficients c[n] (n=1, . . . , N) as the coefficients of product-sum arithmetic, calculates values d[n'] (n'=1, . . . , N', N' is a maximum integer that is N/2 or less) to be used as an element of a distributed arithmetic LUT from the value of each pair of the N coefficients c[n] when they are paired two by two, and outputs the calculated values d[n'] together with the coefficients c[n] to the LUT latch circuit 3. The method of calculating d[n'] (n'=1, . . . , N') is the same as the method explained in the first embodiment.

The LUT latch circuit 3 receives the coefficients c[n] (n=1, . . . , N) and the N' (N' is a maximum integer that is N/2 or less) values d[n'] (n'=1, . . . , N'), latches the coefficients c[n] and the values d[n'] whenever a clock pulse is input, and holds them until the next clock pulse is input. The LUT latch circuit 3 can be implemented by a flip-flop that holds the value of each bit of the coefficients c[n] and the values d[n'] in synchronism with the clock. Then, the LUT latch circuit 3 outputs the held coefficients c[n] (n=1, . . . , N) and values d[n'] (n'=1, . . . , N') to the distributed arithmetic circuits 2-1 to 2-M.

Each of the distributed arithmetic circuits 2-$m$ (m=1, . . . , M) receives the data set X[m] containing the N data x[m, n] (n=1, . . . , N), and the coefficients c[n] (n=1, . . . , N) and the values d[n'] (n'=1, . . . , N') distributed from the LUT latch circuit 3, and outputs the values y[m] equivalent to a result of multiplying, by the coefficients c[n], each of the N data x[m, n] (n=1, . . . , N), which correspond to the circuit, of the data set X[m], and summing up the products, i.e., equivalent to $\Sigma_{n=1, \ldots, N}(c[n] \times x[m, n])$. The method of calculating the values y[m] is the same as the method explained in the first embodiment.

The arithmetic circuit shown in FIG. 5 differs from the arithmetic circuit shown in FIG. 1 in that the LUT latch circuit 3 is inserted between the LUT generation circuit 1 and the distributed arithmetic circuits 2-1 to 2-M. That is, the LUT generation circuit 1 and the M parallel distributed arithmetic circuits 2-$m$ (m=1 . . . , M) are pipelined.

In the arithmetic circuit shown in FIG. 1, a processing time during which the LUT generation circuit 1 calculates d[n'] (n'=1, . . . , N') from c[n] (n=1, . . . , N) is a generation time Td_LUT, and a processing time during which the distributed arithmetic circuit 2-$m$ generates the numerical values y[m] equivalent to $\Sigma_{n=1, \ldots, N}(c[n] \times x[m, n])$ based on the data x[m, n] (n=1, . . . , N), the coefficients c[n] (n=1, . . . , N), and the values d[n'] (n'=1, . . . , N') is a distributed arithmetic time Td. The total time of the generation time Td_LUT and the distributed arithmetic time Td, i.e., (Td_LUT+Td) restricts the upper limit of the clock frequency of a system including the arithmetic circuit.

On the other hand, in the arithmetic circuit shown in FIG. 5, each of the generation time Td_LUT and the distributed arithmetic time Td restricts the upper limit of the clock frequency of a system including the arithmetic circuit.

That is, the upper limit of the clock frequency of a system adopting the arithmetic circuit shown in FIG. 1 is 1/(Td_LUT+Td), whereas the upper limit of the clock frequency of a system adopting the arithmetic circuit shown in FIG. 5 is a smaller one of 1/Td_LUT and 1/Td. More specifically, the arithmetic circuit shown in FIG. 5 operates more rapidly than the arithmetic circuit shown in FIG. 1.

Generally, the speed (throughput) of a circuit in which processes flow in one direction can be increased by adopting a pipeline configuration. Since, however, a large number of flip-flops are used, the circuit scale and the power consumption increase.

In this embodiment, flip-flops posing the problem in the pipeline configuration are the flip-flops used in the circuit that holds the coefficients c[n] (n=1, . . . , N) and the values d[n'] (n'=1, . . . , N') in synchronism with clocks in the LUT latch circuit 3.

The circuit scale and the power consumption of the pipeline configuration are almost proportional to the number of elements of an LUT, i.e., the number (N+N') of the coefficients c[n] (n=1, . . . , N) and the values d[n'] (n'=1, . . . , N'). More accurately, d[n'] (n'=1, . . . , N') as the sum of c[2×n'−1] and c[2×n'] has a bit width larger by at least 1 bit, so the number of flip-flops to be added is not completely proportional to (N+N'). Since, however, the bit width of c[n] is generally much larger than 1 bit, the number of flip-flops can be regarded as being almost proportional to (N+N').

As explained in the first embodiment, however, in the first embodiment and the second embodiment, the number of elements of the LUT (the LUT generation circuit 1 and the LUT indexing circuit 200$m$-$n'$-$l$) is reduced so that the LUT need not be formed by using a memory circuit.

In the product-sum arithmetic circuit shown in FIG. 10, N-nomial product-sum arithmetic is performed by distributed arithmetic by using one LUT 1001, so the number of elements of the LUT 1001 is $2^{N-1}$. In the arithmetic circuits of this embodiment and the first embodiment, the number of elements is reduced to (N×1.5) by dividing N-nomial product-sum arithmetic into N/2 binomial product-sum arithmetics. For example, when N=8, the number of elements can be reduced from 255 to 12. As described above, when compared to a case in which a pipeline configuration is formed based on the product-sum arithmetic circuit shown in FIG. 10, this embodiment can largely reduce the number of flip-flops to be added when forming a pipeline configuration, and hence can improve the throughput without increasing the circuit scale and the power consumption.

Also, when using a pipeline configuration for a general product-sum arithmetic circuit formed by combining a multiplication circuit and an addition circuit without using distributed arithmetic, it is possible to adopt an arrangement in which flip-flops are inserted between the multiplication circuit and the addition circuit. Since the number of flip-flops to be inserted between the multiplication circuit and the addition circuit is proportional to the number M of parallel product-sum arithmetics, the ratio of the scale of the flip-flops to the whole arithmetic circuit is high. Consequently, the circuit scale and the power consumption increased by the adoption of the pipeline configuration pose problems. In the arithmetic circuit of this embodiment, however, the number of flip-flops to be inserted when forming a pipeline configuration does not increase in proportion to the number M of parallel arithmetics, and need only be a number proportional to the number of LUT elements that is small.

As described above, in the conventional product-sum arithmetic circuit, the circuit scale and the power consumption largely increase when forming a pipeline configuration. However, when forming a pipeline structure by dividing the LUT generation circuit 1 and the M parallel distributed arithmetic circuits 2-$m$ ($m=1, \ldots, M$) as disclosed in this embodiment, the arithmetic circuit of this embodiment can improve the throughput without increasing the circuit scale and the power consumption.

Third Embodiment

Figure 6:
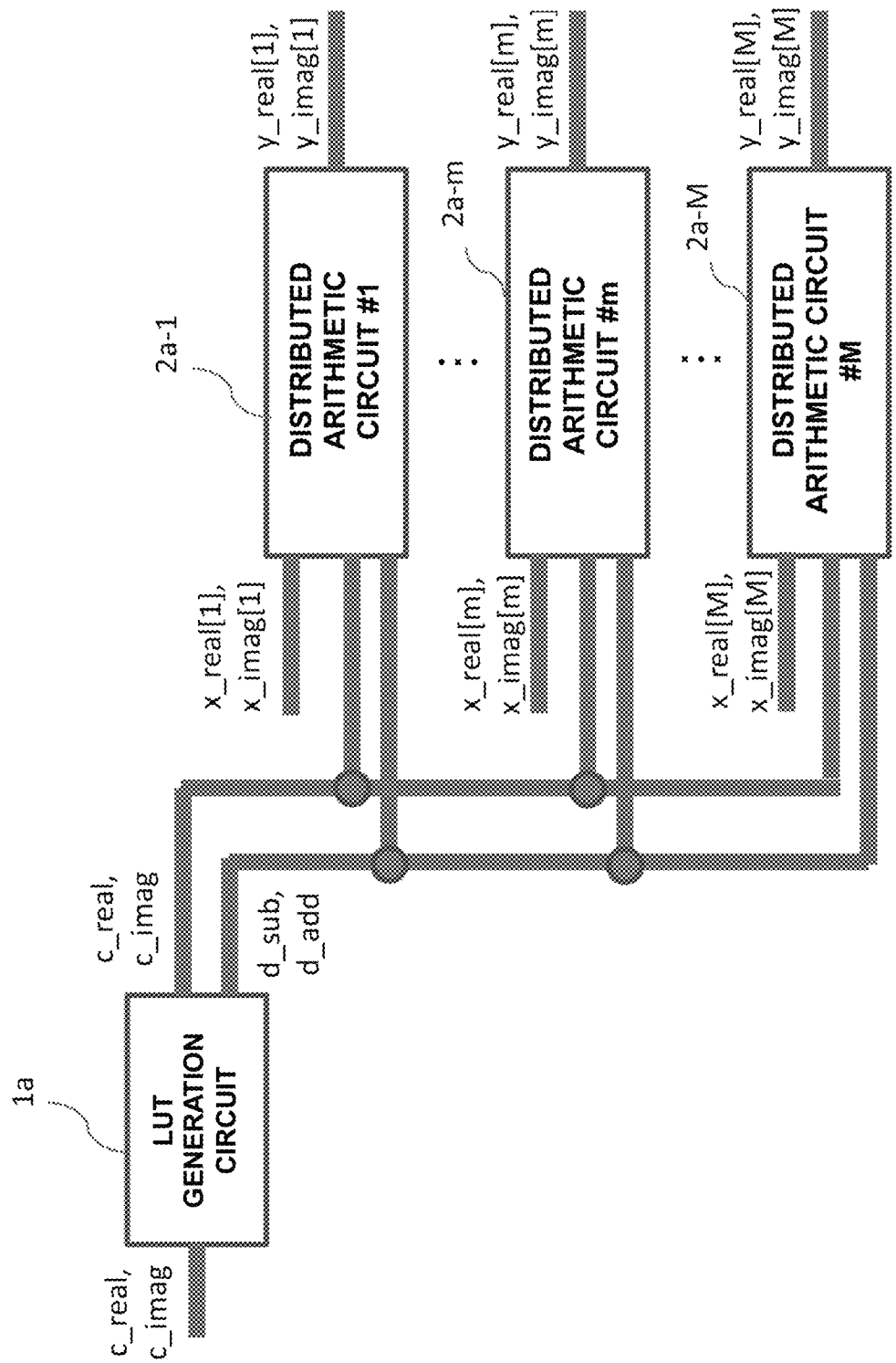
FIG. 6 is a block diagram showing the arrangement of an arithmetic circuit according to the third embodiment of the present invention.

The third embodiment of the present invention will be explained below. FIG. 6 is a block diagram showing the arrangement of an arithmetic circuit according to the third embodiment of the present invention. This arithmetic circuit shown in FIG. 6 receives M (M is an integer of 2 or more) complex numbers X[m] ($m=1, \ldots, M$) each of which is divided into a real part value x_real[m] and an imaginary part value x_imag[m] ($m=1, \ldots, M$), and a complex number coefficient C divided into a real part value c_real and an imaginary part value c_imag. Note that data x[m, n] ($m=1, \ldots, M, n=1, \ldots, N$) is a signed numerical value (a numerical value expressed by a two's-complement binary number) that can take a negative value.

From the abovementioned inputs, the arithmetic circuit shown in FIG. 6 obtains and outputs M complex number values Y[m] ($m=1, \ldots, M$) each of which is divided into a read part value y_real[m] and an imaginary part value y_imag[m] ($m=1, \ldots, M$) by distributed arithmetic. Each of the M complex number values Y[m] is equivalent to (C×X[m]). That is, the real part value y_real[m] is equivalent to c_real×x_real[m]−c_imag×x_imag[m]. The imaginary part value y_imag[m] is equivalent to c_imag×x_real[m]+c_real×x_imag[m].

The arithmetic circuit shown in FIG. 6 includes one LUT generation circuit 1$a$, and M (M is an integer of 2 or more) distributed arithmetic circuits 2$a$-1 to 2$a$-M.

The LUT generation circuit 1$a$ receives the real part value c_real and the imaginary part value c_imag of the complex number coefficient C, calculates a value d_sub equivalent to a difference c_real−c_imag between the real part value c_real and the imaginary part value c_imag, and a value d_add equivalent to a sum c_real+c_imag of the real part value c_real and the imaginary part value c_imag, and outputs the values d_sub and d_add together with the real part value c_real and the imaginary part value c_imag to the distributed arithmetic circuits 2$a$-1 to 2$a$-M.

Each of the distributed arithmetic circuits 2$a$-$m$ ($m=1, \ldots, M$) receives the complex number X[m] ($m=1, \ldots, M$), and the real part value c_real, the imaginary part value c_imag, and the values d_sub and d_add distributed from the LUT generation circuit 1$a$, and calculates and outputs, in parallel for each of M, complex number values Y[m] ($m=1, \ldots, M$) obtained by multiplying data, which corresponds to the circuit, of the complex numbers X[m] by the complex number coefficient C, and summing up the products.

The distributed arithmetic circuit 2$a$-$m$ forms a real part calculation LUT having 0, c_real, −c_imag, and d_sub as the numerical values of elements, and an imaginary part calculation LUT having 0, c_imag, c_real, and d_add as the values of elements, obtains the result of real part product-sum arithmetic c_real×x_real[m]−c_imag×x_imag[m] by distributed arithmetic using the real part calculation LUT, and outputs the result as y_real[m]. In addition, the distributed arithmetic circuit 2$a$-$m$ obtains the result of imaginary part product-sum arithmetic c_imag×x_real[m]+c_real×x_imag[m] by distributed arithmetic using the imaginary part calculation LUT, and outputs the result as y_imag[m].

Figure 7:
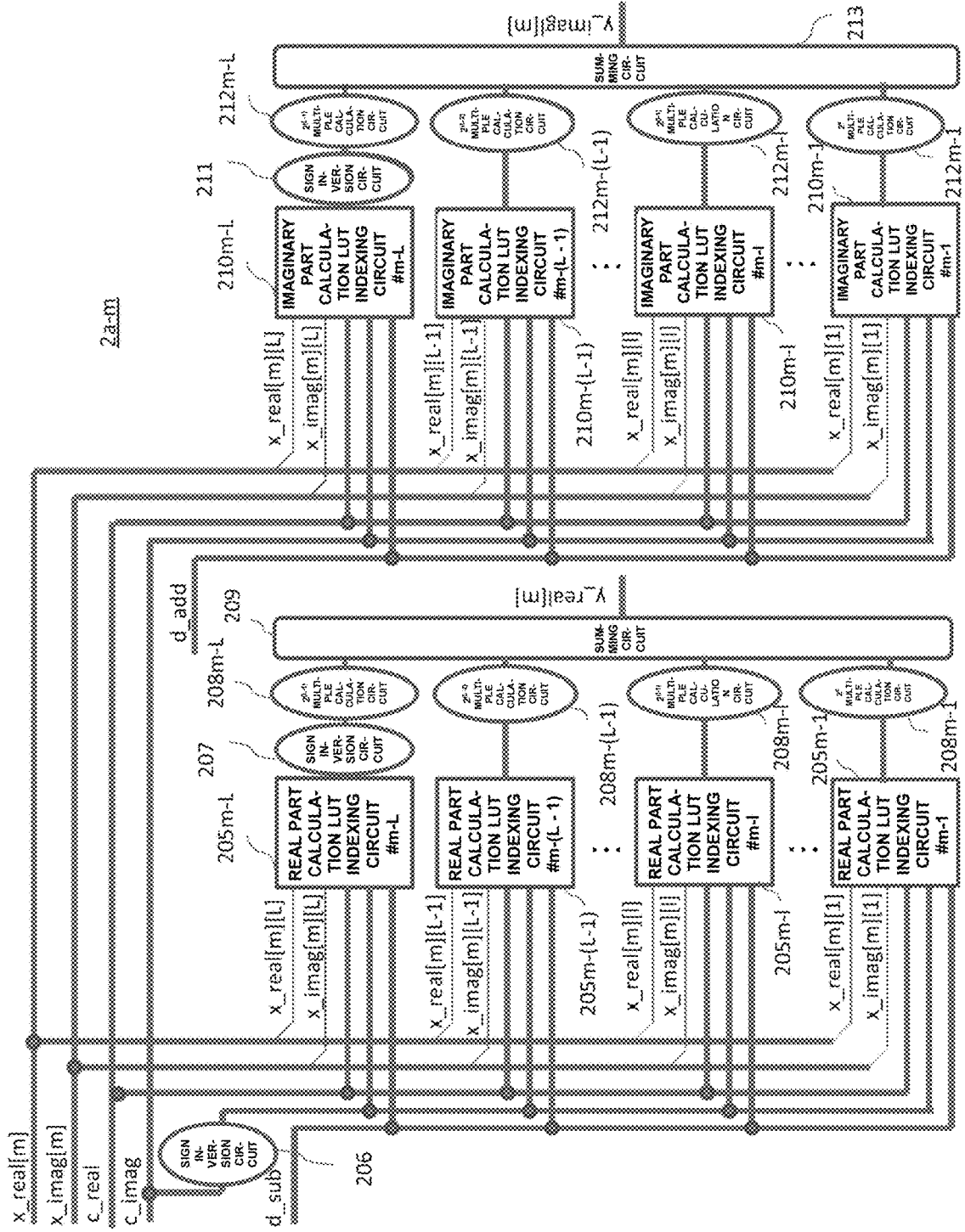
FIG. 7 is a block diagram showing the arrangement of a distributed arithmetic circuit according to the third embodiment of the present invention.

FIG. 7 shows the arrangement of the distributed arithmetic circuit 2$a$-$m$ ($m=1, \ldots, M$). Let L be the bit width of one of arbitrary data x_real[m] ($m=1, \ldots, M$) and x_imag[m] ($m=1, \ldots, M$) expressed by binary numbers, x_real[m][l] ($l=1, \ldots, L$) be each bit of the data x_real[m] to be input to the distributed arithmetic circuit 2$a$-$m$, and x_imag[m][l] ($l=1, \ldots, L$) be each bit of x_imag[m].

The distributed arithmetic circuit 2$a$-$m$ shown in FIG. 7 includes L real part calculation LUT indexing circuits 205$m$-$l$ (selection circuits for real part calculation), sign inversion circuits 206 and 207, L multiple calculation circuits 208$m$-$l$, a summing circuit 209, L imaginary part calculation LUT indexing circuits 210$m$-$l$ (selection circuits for imaginary part calculation), a sign inversion circuit 211, L multiple calculation circuits 212$m$-$l$, and a summing circuit 213.

The distributed arithmetic circuit 2$a$-$m$ includes the real part calculation LUT indexing circuit 205$m$-$l$ and the imaginary part calculation LUT indexing circuit 210$m$-$l$ formed for each bit position $l$ ($l=1, \ldots, L$) of the data x_real[m] and x_imag[m].

The real part calculation LUT indexing circuit 205$m$-$l$ obtains one of four element values of the real part calculation LUT, i.e., 0, c_real, −c_imag, and d_sub, based on bits x_real[m][l] and x_imag[m][l], in the bit position $l$ corresponding to the circuit, of the data x_real[m] and x_imag[m].

The imaginary part calculation LUT indexing circuit 210$m$-$l$ obtains one of four element values of the imaginary part calculation LUT, i.e., 0, c_imag, c_real, and d_add, based on the bits x_real[m][l] and x_imag[m][l], in the bit position $l$ corresponding to the circuit, of the data x_real[m] and x_imag[m].

FIG. 8 shows the relationship between the values of the bits x_real[m][l] and x_imag[m][l], the selected element value of the real part calculation LUT, and the selected element value of the imaginary part calculation LUT. The relationship between the values of the bits x_real[m][l] and x_imag[m][l] and the element values of the real part calculation LUT and the imaginary part calculation LUT is the same as the relationship between addresses and stored values corresponding to the addresses shown in FIG. 12 in the case in which N=2 (binomial product-sum arithmetic).

That is, the address a[0] shown in FIG. 12 corresponds to the bit x_real[m][l] of this embodiment, and the address a[1] shown in FIG. 12 corresponds to the bit x_imag[m][l] of this embodiment. Also, in real part product-sum arithmetic for obtaining y_real[m], the coefficient c[0] shown in FIG. 12 corresponds to c_real of this embodiment, and the coefficient c[1] shown in FIG. 12 corresponds to −c_imag of this embodiment. Furthermore, in imaginary part product-sum arithmetic for obtaining y_imag[m], the coefficient c[0] shown in FIG. 12 corresponds to c_imag of this embodiment, and the coefficient c[1] shown in FIG. 12 corresponds to c_real of this embodiment.

In the distributed arithmetic circuit 2$a$-$m$ shown in FIG. 7, the element value of the real part calculation LUT, which is selected for each bit position $l$ ($l=1, \ldots, L$) by the real part calculation LUT indexing circuit 205$m$-$l$ is multiplied by $2^{(l-1)}$ by the multiple calculation circuit 208$m$-$l$.

Likewise, the element value of the imaginary part calculation LUT, which is selected for each bit position $l$ (l=1, . . . , L) by the imaginary part calculation LUT indexing circuit 210*m-l*, is multiplied by $2^{(l-1)}$ by the multiple calculation circuit 212*m-l*.

The summing circuit 209 sums up the values calculated by the L multiple calculation circuits 208*m-l*, and the summing circuit 213 sums up the values calculated by the L multiple calculation circuits 212*m-l*.

Note that for the bit position where l=L (the MSB position of data) of the real part value, the sign inversion circuit 207 inverts the sign of the element value selected by the real part calculation LUT indexing circuit 205*m*-L, and then the multiple calculation circuit 208*m*-L multiplies the element value by $2^{(L-1)}$. Similarly, for the bit position where l=L of the imaginary part value, the sign inversion circuit 211 inverts the sign of the element value selected by the imaginary part calculation LUT indexing circuit 210*m*-L, and then the multiple calculation circuit 212*m*-L multiplies the element value by $2^{(L-1)}$.

As described above, the result of summation performed on all the bit positions by the summing circuit 209 is output as y_real[m] as the real part values of the complex number values Y[m] to be output by the arithmetic circuit of this embodiment. Also, the result of summation performed by the summing circuit 213 is output as y_imag[m] as the imaginary part values of the complex number values Y[m].

In the distributed arithmetic circuit 2*a-m* shown in FIG. 7, as in the circuit of the first embodiment shown in FIG. 3, processes equivalent to the LUT 1001, the accumulated value register 1002, the doubling circuit 1003, and the addition circuit 1004 shown in FIG. 10 are performed on all the bit positions l (l=1, . . . , L) at the same time. Accordingly, the result of product-sum arithmetic can immediately be obtained without inputting L clock pulses.

Note that in this embodiment, the sign of the element value selected by the real part calculation LUT indexing circuit 205*m*-L is inverted, and the sign of the element value selected by the imaginary part calculation LUT indexing circuit 210*m*-L is inverted, for the bit position L of the MSB. This sign inversion is performed because the data x[m, n] (m=1, . . . , M, n=1, . . . , N) is a signed numerical value (a numerical value expressed by a two's-complement binary number) that can take a negative value.

When x_real[m] and x_imag[m] are unsigned numerical values limited to 0 or more, the element value selected by the real part calculation LUT indexing circuit 205*m*-L can be multiplied by $2^{(L-1)}$ by the multiple calculation circuit 208*m*-L, and the element value selected by the imaginary part calculation LUT indexing circuit 210*m*-L can be multiplied by $2^{(L-1)}$ by the multiple calculation circuit 212*m*-L, for the bit position L of the MSB as well, like other bit positions.

Also, the process of multiplying the element values selected by the real part calculation LUT indexing circuit 205*m-l* and the imaginary part calculation LUT indexing circuit 210*m-l* by $2^{(l-1)}$ for the abovementioned bit position l can be implemented by shifting the element values expressed by binary numbers to the left by (l−1) bits. Therefore, the L multiple calculation circuits 208*m-l* and the L multiple calculation circuits 212*m-l* can be implemented by simple circuits without using any multiplication circuit.

The M complex number values Y[m] (m=1, . . . , M) output from the arithmetic circuit of this embodiment are the same as the results (C×X[m]) of product-sum arithmetic that multiplies the complex numbers X[m] (m=1, . . . , M) by the complex number coefficient C and sums up the products.

In the first embodiment, the number of numerical values to be held in the LUT (the LUT generation circuit 1 and the LUT indexing circuit 200*m-n'-l*) is largely reduced by dividing N-nomial product-sum arithmetic into N' (=N/2) binomial product-sum arithmetics.

On the other hand, in this embodiment, multiplication between complex numbers takes the form of binomial product-sum arithmetic. Accordingly, distributed arithmetic can be performed by using the LUT (the LUT generation circuit 1*a*, the real part calculation LUT indexing circuit 205*m-l*, and the imaginary part calculation LUT indexing circuit 210*m-l*) having only four element values.

This embodiment uses the abovementioned feature related to multiplication between complex numbers, and each of the LUTs for obtaining the numerical values of the real part and the imaginary part of the result obtained by multiplying data of a complex number by a coefficient is not a memory circuit but a circuit that generates element values of the LUT in advance and a circuit that selects an element value by using a logic gate such as a selector. With this arrangement, the same effect as that of the first embodiment can be obtained.

That is, when each LUT is a memory circuit as in the conventional system, a plurality of memory circuits obtained by copying LUTs must be used for each bit position of data or for each product-sum arithmetic circuit, in order to increase the throughput by parallelization for searching the LUTs for all bit positions of the data at the same time, or by parallelization of complex number multiplication circuits for multiplying the M complex number data X[m] (m=1, . . . , M) by the complex number coefficient C.

The arithmetic circuit of this embodiment uses no memory circuit in the LUT, and hence can be divided into a circuit (the LUT generation circuit 1*a*) for generating/holding each element value of the LUT in advance, and circuits (the real part calculation LUT indexing circuit 205*m-l* and the imaginary part calculation LUT indexing circuit 210*m-l*) for selecting each element value of the LUT. Therefore, parallelization is not performed on the LUT generation circuit 1*a* but performed on only the real part calculation LUT indexing circuit 205*m-l* and the imaginary part calculation LUT indexing circuit 210*m-l*. This makes it possible to prevent the formation of a redundant circuit, i.e., the parallelization (copying) of the circuits for holding each element value of the LUT, and suppress an increase in circuit scale caused by parallelization.

Note that when the arithmetic circuit of this embodiment is applied to the multiplication of complex numbers, the generation and distribution of c_real as a common element of the element values of the real part calculation LUT and the imaginary part calculation LUT are commonized, instead of separately generating and distributing the element values of the real part calculation LUT and the imaginary part calculation LUT. Furthermore, since the real part calculation LUT has −c_imag as an element, the sign of c_imag as an element value of the imaginary part calculation LUT is inverted by the sign inversion circuit 206 of the real part calculation LUT indexing circuit 205*m-l*, thereby reducing the number of lines in the circuit to be used in distribution. Commonization and sign inversion as described above can reduce the circuit scale and the power consumption when compared to the arrangement that performs generation and distribution by completely separating the real part calculation LUT and the imaginary part calculation LUT.

Fourth Embodiment

Figure 9:
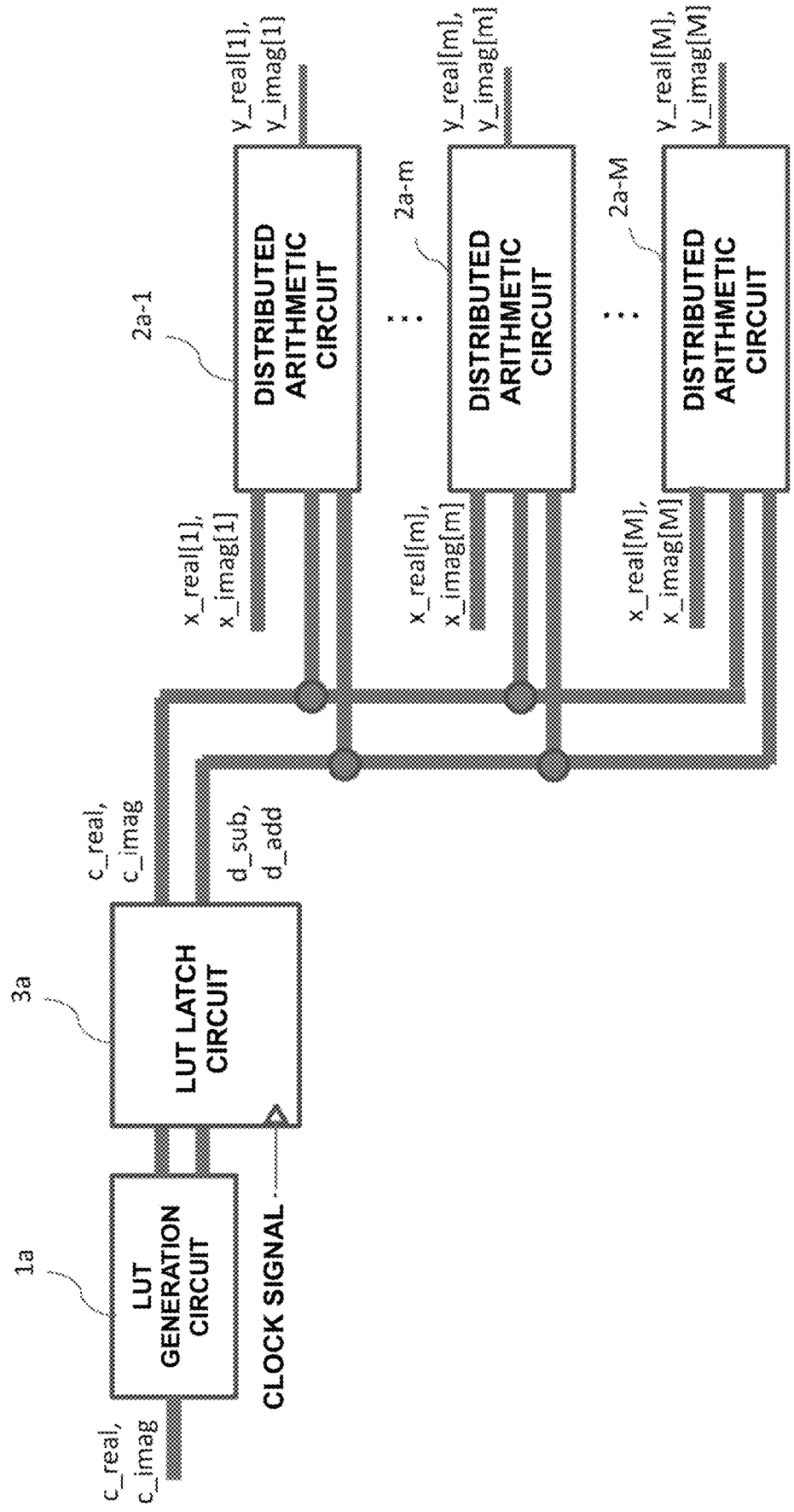
FIG. 9 is a block diagram showing the arrangement of an arithmetic circuit according to the fourth embodiment of the present invention.

The fourth embodiment of the present invention will be explained below. FIG. 9 is a block diagram showing the arrangement of an arithmetic circuit according to the fourth embodiment of the present invention. In FIG. 9, the same reference numerals as in FIG. 6 denote the same parts. This embodiment discloses an arrangement that improves the throughput more than the arithmetic circuit disclosed in the third embodiment, without increasing the circuit scale and the power consumption.

Like the arithmetic circuit shown in FIG. 6, the arithmetic circuit shown in FIG. 9 receives M (M is an integer of 2 or more) complex numbers X[m] (m=1, . . . , M) each of which is divided into a real part value x_real[m] and an imaginary part value x_imag[m] (m=1, . . . , M), and a complex number coefficient C divided into a real part value c_real and an imaginary part value c_imag. Note that data x[m, n] (m=1, . . . , M, n=1, . . . , N) is a signed numerical value (a numerical value expressed by a two's-complement binary number) that can take a negative value.

Like the arithmetic circuit shown in FIG. 6, the arithmetic circuit shown in FIG. 9 obtains and outputs, from the abovementioned inputs, M complex number values Y[m] (m=1, . . . , M) each of which is divided into a read part value y_real[m] and an imaginary part value y_imag[m] (m=1, . . . , M) by distributed arithmetic. Each of the M complex number values Y[m] is equivalent to (C×X[m]). That is, the real part value y_real[m] is equivalent to c_real×x_real[m]−c_imag×x_imag[m]. The imaginary part value y_imag[m] is equivalent to c_imag×x_real[m]+c_real×x_imag[m].

The arithmetic circuit shown in FIG. 9 includes an LUT generation circuit 1a, an LUT latch circuit 3a, and M (M is an integer of 2 or more) distributed arithmetic circuits 2a-1 to 2a-M.

The LUT generation circuit 1a receives the real part value c_real and the imaginary part value c_imag of the complex number coefficient C, calculates a value d_sub equivalent to a difference c_real−c_imag between the real part value c_real and the imaginary part value c_imag, and a value d_add equivalent to a sum c_real+c_imag of the real part value c_real and the imaginary part value c_imag, and outputs the values d_sub and d_add together with the real part value c_real and the imaginary part value c_imag to the LUT latch circuit 3a.

The LUT latch circuit 3a receives c_real, c_imag, d_sub, and d_add output from the LUT generation circuit 1a, latches the values of c_real, c_imag, d_sub, and d_add whenever a clock pulse is input, and holds the values until the next clock pulse is input. The LUT latch circuit 3a can be implemented by a flip-flop that holds the value of each bit of the values of c_real, c_imag, d_sub, and d_add in synchronism with the clock. The LUT latch circuit 3a outputs the held c_real, c_imag, d_sub, and d_add to the distributed arithmetic circuits 2a-1 to 2a-M.

As in the third embodiment, each of the distributed arithmetic circuits 2a-m (m=an integer of 1, . . . , M) receives the complex number X[m] (m=1, . . . , M), and the real part value c_real, the imaginary part value c_imag, and the values d_sub and d_add distributed from the LUT latch circuit 3, and calculates and outputs, in parallel for each of M, the complex number values Y[m] (m=1, . . . , M) obtained by multiplying data, which corresponds to the circuit, of the complex numbers X[m] by the complex number coefficient C, and summing up the products.

The distributed arithmetic circuit 2a-m forms a real part calculation LUT having 0, c_real, −c_imag, and d_sub as the numerical values of elements, and an imaginary part calculation LUT having 0, c_imag, c_real, and d_add as the numerical values of elements, obtains the result of real part product-sum arithmetic c_real×x_real[m]−c_imag×x_imag [m] by distributed arithmetic using the real part calculation LUT, and outputs the result as y_real[m]. In addition, the distributed arithmetic circuit 2a-m obtains the result of imaginary part product-sum arithmetic c_imag×x_real[m]+c_real×x_imag[m] by distributed arithmetic using the imaginary part calculation LUT, and outputs the result as y_imag [m]. The arrangement of the distributed arithmetic circuit 2a-m is the same as that explained in the third embodiment.

The arithmetic circuit shown in FIG. 9 differs from the arithmetic circuit shown in FIG. 6 in that the LUT latch circuit 3a is inserted between the LUT generation circuit 1a and the distributed arithmetic circuits 2a-1 to 2a-M. That is, the LUT generation circuit 1a and the M parallel distributed arithmetic circuits 2a-m (m=1, . . . , M) are pipelined.

In the arithmetic circuit shown in FIG. 6, a processing time during which the LUT generation circuit 1a calculates d_sub and d_add from the complex number coefficient C is a generation time Td_LUT, and a processing time during which the distributed arithmetic circuit 2a-m generates y_real[m] and y_imag[m] is a distributed arithmetic time Td. The total time of the generation time Td_LUT and the distributed arithmetic time Td, i.e., (Td_LUT+Td) restricts the upper limit of the clock frequency of a system including the arithmetic circuit.

On the other hand, in the arithmetic circuit shown in FIG. 9, each of the generation time Td_LUT and the distributed arithmetic time Td restricts the upper limit of the clock frequency of a system including the arithmetic circuit.

That is, the upper limit of the clock frequency of a system adopting the arithmetic circuit shown in FIG. 6 is 1/(Td_LUT+Td), whereas the upper limit of the clock frequency of a system adopting the arithmetic circuit shown in FIG. 9 is a smaller one of 1/Td_LUT and 1/Td. More specifically, the arithmetic circuit shown in FIG. 9 operates more rapidly than the arithmetic circuit shown in FIG. 6.

Generally, the speed (throughput) of a circuit in which processes flow in one direction can be increased by adopting a pipeline configuration. Since, however, a large number of flip-flops are used, the circuit scale and the power consumption increase.

In this embodiment, flip-flops posing the problem in the pipeline configuration are only the flip-flops used in the circuit that holds c_real, c_imag, d_sub, and d_add in synchronism with clocks in the LUT latch circuit 3a. When the number M of the parallel distributed arithmetic circuits 2a-1 to 2a-M is large, the ratio of the scale of flip-flops to the whole arithmetic circuit is very low. Therefore, the increase in circuit scale and power consumption caused by the adoption of the pipeline configuration disclosed in this embodiment poses no problem.

Also, when using a pipeline configuration for a general product-sum arithmetic circuit formed by combining a multiplication circuit and an addition circuit without using distributed arithmetic, it is possible to adopt an arrangement in which flip-flops are inserted between the multiplication circuit and the addition circuit. Since the number of flip-flops to be inserted between the multiplication circuit and the addition circuit is proportional to the number M of parallel complex number multiplications, the ratio of the scale of the flip-flops to the whole arithmetic circuit is high. Consequently, the circuit scale and the power consumption increased by the adoption of the pipeline configuration pose problems. In the arithmetic circuit of this embodiment, however, the number of flip-flops to be inserted when forming a pipeline configuration does not increase in proportion to the number M of parallel arithmetics, and need only be a number proportional to the number of LUT elements that is small.

As described above, in the conventional complex number multiplication circuit, the circuit scale and the power consumption largely increase when forming a pipeline configuration. However, when forming a pipeline structure by dividing the LUT generation circuit 1a and the M parallel distributed arithmetic circuits 2a-m (m=1, . . . , M) as disclosed in this embodiment, the arithmetic circuit of this embodiment can improve the throughput without increasing the circuit scale and the power consumption.

Note that each of the arithmetic circuits explained in the first to fourth embodiments can be implemented by, e.g., an FPGA (Field Programmable Gate Array).

INDUSTRIAL APPLICABILITY

The present invention is applicable to an arithmetic circuit.

EXPLANATION OF THE REFERENCE NUMERALS AND SIGNS 1, 2a . . . LUT generation circuit, 2-1–2-M, 2a-1–2a-M . . . distributed arithmetic circuit, 3, 3a . . . LUT latch circuit, 20m . . . binomial distributed arithmetic circuit, 21m . . . binomial distributed arithmetic result summing circuit, 22m . . . auxiliary multiplication circuit, 200m . . . LUT indexing circuit, 202, 206, 207, 211 . . . sign inversion circuit, 203m, 208m, 212m . . . multiple calculation circuit, 204, 209, 213 . . . summing circuit, 205m . . . real part calculation LUT indexing circuit, 210m . . . imaginary part calculation LUT indexing circuit

The invention claimed is:

1. An arithmetic circuit that receives a data set X[m] (m=M) containing M (M is an integer of not less than 2) pairs of N (N is an integer of not less than 2) data x[m, n] (n=1, . . . , N), and N coefficients c[n], and calculates and outputs M values y[m] of product-sum arithmetic, the arithmetic circuit comprising:
an LUT generation circuit configured to, when the N coefficients c[n] are paired two by two, output a value calculated for each of the pairs; and
M distributed arithmetic circuits configured to calculate and output, in parallel for each of the M pairs, the values y[m] of the product-sum arithmetics as a result of multiplying the N data x[m, n] of the data set X[m] by the N coefficients c[n] and summing up the products,
wherein each of the distributed arithmetic circuits includes:
a plurality of binomial distributed arithmetic circuits configured to calculate and output, based on a value obtained by pairing the N data x[m, n] corresponding to the circuit two by two, a value obtained by pairing the N coefficients c[n] two by two, and the value calculated by the LUT generation circuit, a value of binomial product-sum arithmetic that multiplies the two data x[m, n] by the two coefficients c[n] and sums up the products, in parallel for each of the pairs; and
a binomial distributed arithmetic result summing circuit configured to output a result of summing up the values calculated by the plurality of binomial distributed arithmetic circuits, as the values y[m] of the product-sum arithmetic.

2. The arithmetic circuit according to claim 1, further comprising an LUT latch circuit formed between the LUT generation circuit and the M distributed arithmetic circuits, and configured to hold the N coefficients c[n] and the value calculated by the LUT generation circuit in synchronism with a clock, and output the held values to the M distributed arithmetic circuits.

3. The arithmetic circuit according to claim 1, wherein the LUT generation circuit calculates, as values d[n'], a sum $c[2\times n'-1]+c[2\times n']$ (n'=1, . . . , N') of values $c[2\times n'-1]$ and $c[2\times n']$ obtained by pairing the N coefficients c[n] two by two, for each of N' (N' is a maximum integer that is not more than N/2) pairs, and each of the distributed arithmetic circuits receives the data set X[m], the coefficients c[n] output from the LUT generation circuit, and the values d[n'] calculated by the LUT generation circuit, and outputs the values y[m] of the product-sum arithmetic as a result of multiplying the N data x[m, n], which correspond to the circuit, of the data set X[m] by the N coefficients c[n] and summing up the products.

4. The arithmetic circuit according to claim 1, wherein each of the distributed arithmetic circuits further includes an auxiliary multiplication circuit configured to output a result of calculating $c[N]\times x[m, N]$ when N is an odd number, and
the binomial distributed arithmetic result summing circuit outputs, when N is an odd number, a result of summing up the values calculated by the plurality of binomial distributed arithmetic circuits and the value calculated by the auxiliary multiplication circuit, as the values y[m] of the product-sum arithmetic.

5. The arithmetic circuit according to claim 1, wherein the binomial distributed arithmetic circuit includes:
a plurality of indexing circuits formed for each bit position of two values of the same pair of the N data x[m, n], and configured to obtain, for each bit position, one element value corresponding to two values in the same bit position, which form two values of the same pair of the N data x[m, n], from element values including 0, two values of the same pair of the N coefficients c[n], and a value calculated from the two values of the coefficients c[n] by the LUT generation circuit;
a plurality of multiple calculation circuits configured to multiply, for each bit position, the element values obtained by the plurality of indexing circuits by $2^l$ (l is an ordinal number of a bit position); and
a summing circuit configured to output a result of summing up the values calculated by the plurality of multiple calculation circuits, as the value of the binomial product-sum arithmetic.

* * * * *